United States Patent
Teixeira

(10) Patent No.: US 9,942,045 B2
(45) Date of Patent: Apr. 10, 2018

(54) SYSTEM AND METHOD FOR PERFORMING SECURE COMMUNICATIONS

(71) Applicant: CRYPTOMETRY LIMITED, London (GB)

(72) Inventor: Marcio Coelho Teixeira, Belo Horizonte (BR)

(73) Assignee: CRYPTOMETRY LIMITED, London (GB)

( * ) Notice: Subject to any disclaimer, the term of this patent is extended or adjusted under 35 U.S.C. 154(b) by 0 days.

(21) Appl. No.: 15/352,228

(22) Filed: Nov. 15, 2016

(65) Prior Publication Data

US 2017/0118024 A1    Apr. 27, 2017

Related U.S. Application Data

(63) Continuation of application No. 14/767,273, filed as application No. PCT/CA2015/000042 on Jan. 27, 2015, now Pat. No. 9,531,537.
(Continued)

(51) Int. Cl.
*H04L 29/06* (2006.01)
*H04L 9/32* (2006.01)
(Continued)

(52) U.S. Cl.
CPC .......... *H04L 9/3228* (2013.01); *H04L 9/0822* (2013.01); *H04L 9/0825* (2013.01); *H04L 9/0866* (2013.01); *H04L 9/0869* (2013.01); *H04L 9/0891* (2013.01); *H04L 9/14* (2013.01); *H04L 9/16* (2013.01); *H04L 9/30* (2013.01); *H04L 2209/24* (2013.01)

(58) Field of Classification Search
CPC .......... H04L 9/0825; H04L 63/08; H04L 9/32
See application file for complete search history.

(56) References Cited

U.S. PATENT DOCUMENTS 6,240,187 B1   5/2001  Lewis
7,054,447 B1   5/2006  Price, III
(Continued)

FOREIGN PATENT DOCUMENTS

WO   WO-2013025060 A3   2/2013

OTHER PUBLICATIONS

International Application No. PCT/CA2015/000042. International Search Report dated Apr. 30, 2015.
(Continued)

*Primary Examiner* — Jason K Gee
(74) *Attorney, Agent, or Firm* — Perry + Currier Inc.

(57) ABSTRACT

A server and method for providing a content selection is provided. The server receives content targeting parameters and obtains content items from at least one content site based on the content targeting parameters. The server can further identify content descriptors for the content items and generate a first content cluster from a subset of the content items based on the content descriptors. The server can further generate a second content cluster from a second subset of the content items based on the content descriptors and rank the first and the second content clusters in an order of usefulness. The ranking of the content clusters can be based on at least one of an importance of content, a recentness of the content items and a size of the content cluster.

4 Claims, 29 Drawing Sheets

Related U.S. Application Data

(60) Provisional application No. 61/934,341, filed on Jan. 31, 2014, provisional application No. 62/038,589, filed on Aug. 18, 2014, provisional application No. 62/090,632, filed on Dec. 11, 2014.

(51) Int. Cl.
*H04L 9/08* (2006.01)
*H04L 9/14* (2006.01)
*H04L 9/16* (2006.01)
*H04L 9/30* (2006.01)

(56) References Cited

U.S. PATENT DOCUMENTS

| | | |
|---|---|---|
| 7,120,610 B1 * | 10/2006 | Brookner ............... G06Q 50/32 705/401 |
| 2004/0179684 A1 | 9/2004 | Appenzeller et al. |
| 2005/0154889 A1 | 7/2005 | Ashley et al. |
| 2006/0198517 A1 | 9/2006 | Cameron et al. |
| 2007/0263875 A1 * | 11/2007 | Kitaya ................. H04L 9/0836 380/279 |
| 2010/0268747 A1 | 10/2010 | Kern et al. |
| 2013/0124870 A1 | 5/2013 | Rosati et al. |

OTHER PUBLICATIONS

Non-Final Rejection dated Apr. 26, 2016 for U.S. Appl. No. 14767273.
International Application No. PCT/CA2015/000042. Written Opinion dated Apr. 30, 2015.
Extended European Search Report dated Sep. 14, 2017, by EPO, re European Patent Application No. 15742555.4.

* cited by examiner

SYSTEM AND METHOD FOR PERFORMING SECURE COMMUNICATIONS

CROSS REFERENCE TO RELATED APPLICATIONS

This application is a continuation application of U.S. patent application Ser. No. 14/767,273, filed Aug. 11, 2015, which is a National Stage of International Application No. PCT/CA2015/000042, filed Jan. 27, 2015, which claims priority to U.S. provisional application No. 61/934,341, filed Jan. 31, 2014, U.S. provisional application No. 62/038,589, filed Aug. 18, 2014, and U.S. provisional application No. 62/090,632, filed Dec. 11, 2014 all of which are incorporated herein by reference.

BACKGROUND

Data security is of paramount importance as more and more data is collected and maintained in network based systems. An important component of security is secure communications between devices. Specifically, a large amount of data is exchanged between network connected devices every minute. The exchange can take the form of messages, documents and other data communicated between devices, including as emails, attachments, instant messages, files and others.

Today, a large volume of data including emails and documents are communicated with minimal security, meaning that such communications can be readily intercepted and misappropriated by malicious third party devices. Although mechanisms exist for securing such communications, they are typically cumbersome to use and relatively easy to defeat. For example, most existing systems for securing communications rely on asymmetric encryption methods where a publicly available key is used to encrypt data and a private key is used to decrypt it. Asymmetric encryption methods are problematic in that they do not offer as strong a protection as symmetric ones. Moreover, since the public/private key pair remain unchanged, once a key pair is compromised, a vast amount of communications can be deciphered.

Symmetric encryption methods also exist for securing communications that offer stronger protection than asymmetric methods. However, such methods are cumbersome to use. For example, they typically involve exchanging keys out of band, making the setting or renewal of keys cumbersome and thus infrequent. Accordingly, there is a need for a system and method for a secure communications that affords strong protection and is convenient to use.

SUMMARY

It is an objective to provide a novel server and method for secure communications that obviates and mitigates at least one of the above-identified disadvantages of the prior art.

Aspects and advantages will be subsequently apparent, and reside in the details of construction and operation as more fully hereinafter described and claimed, reference being had to the accompanying drawings forming a part hereof, wherein like numerals refer to like parts throughout.

DETAILED DESCRIPTION

Figure 1:
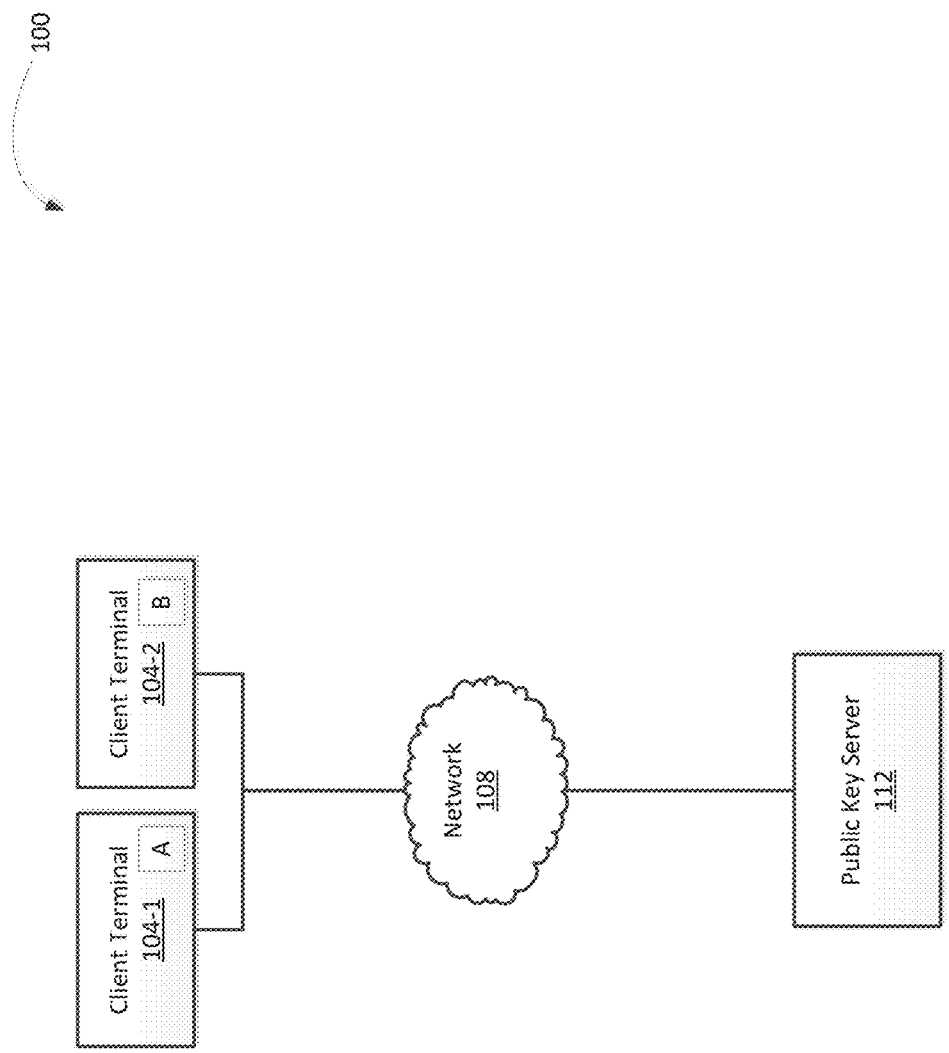
FIG. 1 shows a block diagram of an implementation of a system for secure communications in accordance with an implementation.

FIG. 1 shows a diagram of a system 100 for secure communications. At least one secure communications terminal (the secure communications terminals 104-1 and 104-2) can be connected, via the network 108, to a public key server 112. Collectively, the secure communications terminals 104-1 and 104-2 are referred to as the secure communications terminals 104, and generically as the secure communications terminal 104. This nomenclature is used elsewhere herein. The secure communications terminals 104 can be based on any suitable computing environment, and the type is not particularly limited so long as each secure communications terminal 104 is capable of receiving, processing and sending secured communications. In a present implementation, the secure communications terminals 104 are configured to at least execute instructions that can interact with the network services hosted by the public key server 112 for establishing secure communications. Although in the illustrative example of FIG. 1 only two secure communications terminals are shown, it is to be understood that in other implementations more or fewer secure communications terminals 104 can be present.

Each secure communications terminal 104 includes at least one processor connected to a non-transitory computer-readable storage medium such as a memory. The processor runs or executes operating instructions or applications that are stored in the memory to perform various functions for the secure communications terminal 104. The processor includes one or more microprocessors, microcontrollers, digital signal processors (DSP), state machines, logic circuitry, or any device or devices that process information based on operational or programming instructions stored in the memory. In accordance with the embodiments, the processor processes various functions and data associated with carrying out data encryption, decryption and secure communications.

Memory can be any suitable combination of volatile (e.g. Random Access Memory ("RAM")) and non-volatile (e.g. read only memory ("ROM"), Electrically Erasable Programmable Read Only Memory ("EEPROM"), flash memory, magnetic computer storage device, or optical disc) memory. In one implementation, memory includes both a non-volatile memory for persistent storage of computer-readable instructions and other data, and a non-volatile memory for short-term storage of such computer-readable instructions and other data during the execution of the computer-readable instructions. Other types of computer readable storage medium, which in some implementations may be removable or external to a secure communications terminal 104 are also contemplated, such as secure digital (SD) cards and variants thereof. Other examples of external or removable computer readable storage media include compact discs (CD-ROM, CD-RW) and digital video discs (DVD).

Each secure communications terminal 104 can also include a communications interface operably connected to the processor. The communications interface can allow a secure communications terminal 104 to communicate with other computing devices, for example via the network 108. The communications interface can therefore be selected for compatibility with the network 108. In some implementations of the system 100, the secure communications terminals 104 may be connected to the public key server 112 and/or each other directly, without an intervening network 108 such as where a secure communications terminal 104 is connected to the public key server 112 and/or another secure communications terminal 104 through a wired universal serial bus (USB) connection or a wireless Bluetooth connection. These connections can be established in addition to or in place of a connection through the network 108.

The network 108 can comprise any network capable of linking the public key server 112 with the secure communications terminals 104 and can include any suitable combination of wired and/or wireless networks, including but not limited to a Wide Area Network (WAN) such as the Internet, a Local Area Network (LAN), cell phone networks, Wi-Fi™ networks, WiMAX™ networks and the like.

In general terms, the public key server 112 can comprise any platform capable of assisting with the performance of secured communications. In a present embodiment, the public key server 112 is a server configured for receiving, maintain and providing public keys. The public key server 112 can be based on a server-type computing environment including appropriate configurations of one or more central processing units (CPUs) configured to control and interact with non-transitory computer readable media in the form of computer memory or a storage device. Computer memory or storage device can include volatile memory such as Random Access Memory (RAM), and non-volatile memory such as hard disk drives or FLASH drives, or a Redundant Array of Inexpensive Disks (RAID) or cloud-based storage. The public key server 112 can also include one or more network or communication interfaces, to connect to the network 108 or the secure communications terminals 104. The public key server 112 can also be configured to include input devices such as a keyboard or pointing device or output devices such as a monitor or a display or any of or all of them, to permit local interaction.

Other types of hardware configurations for the public key server 112 are contemplated. For example, the public key server 112 can be implemented as part of a cloud-based computing solution, whereby the functionality of the public key server 112 is implemented as one or more virtual machines executing at a single data center or across a plurality of data centers. The public key server 112 can also be implemented as a distributed server, distributed across multiple computing devices operably connected across a network, for example, the network 108. The software aspect of the computing environment of the public key server 112 can also include remote access capabilities in lieu of, or in addition to, any local input devices or local output devices.

Any desired or suitable operating environment can be used in the computing environment of the public key server 112. The computing environment can be accordingly configured with appropriate operating systems and applications to effect the functionality discussed herein. Those of skill in the art will now recognize that the public key server 112 need not necessarily be implemented as a stand-alone device and can be integrated as part of a multi-purpose server or implemented as a virtual machine.

The public key server 112 is operable to receive, store and send public keys associated with one or more client accounts. The public key server 112 can be further operable to determine that the uploaded keys are not duplicates of previously uploaded keys. Moreover, the public key server 112 can be operable to confirm the client account providing the keys and verify that the uploaded keys were indeed generated by that client account. In variations, there may be more than one public key server 112.

In some implementations, the secure communications terminals 104 are configured to be associated with a client account. For example, as shown in FIG. 1, the secure communications terminal 104-1 is associated with a client account A, whereas secure communications terminal 104-2 is associated with a client account B. Access to a client account is typically obtained based on supplied credentials, such as a user name, an email address, a password and/or other credentials that will now occur to a person of skill. In some variations, more than one account can be associated with a secure communications terminal 104. In further variations, an account can be associated with more than one secure communications terminal 104. In other variations, accounts may not be used, and instead, credentials may be unique credentials associated with a secure communications terminal 104 that are not known by others, such as a unique serial number associated with the device. In these variations, secure communications described below are performed based on device credentials as opposed to client account credentials associated with a secure communications terminal 104.

Based on the client account maintained, a secure communications terminal can be can be configured, in association with a client account, to generate symmetric and asymmetric keys, generate messages, encrypt the generated messages and other data, send generated messages to other secure communications terminals 104, receive messages from other secure communications terminals 104 and decrypt received messages. Encryption performed by the secure communications terminals 104 in association with a client account can be based on keys or key identifiers that are previously generated by that client account and communicated to another client account as part of a previously sent message. For example, in some implementations, a shared symmetric key SSK and a shared symmetric key identifier SSKID may be generated by a client account and included as part of a message sent to another client account. The shared symmetric key SSK can be generated based on any desired key generation method. Accordingly, when the client account receives a subsequent message, which includes the shared symmetric key identifier SSKID, the client account can determine, based on the inclusion of the SSKID, that the message, at least in part, was encrypted by the other client account composing the message, using the shared symmetric key SSK. Thus to decrypt at least portions of the received message, the client account can identify the shared symmetric key SSK, based on the shared symmetric key identifier SSKID, and use the identified shared symmetric key SSK to decrypt portions of the received message. In this manner, each message sent between two client accounts can be encrypted by a different symmetric key that is shared between the two client accounts exchanging the messages. In variations, SSK and SSKID can be used to encrypt a set of messages. Thus, even if a shared symmetric key is compromised by a third party, only one or a set messages can be decrypted.

In variations, the client account can encrypt the shared symmetric key identifier SSKID using another symmetric key that is unique to that client account (unique client key UCK), which is not shared with other client accounts, to reduce the chance of the shared symmetric key identifier SSKID being intercepted and decoded by third party client accounts that are not the sender or the receiver of the messages. In some variations, the unique client key UCK may be generated using a random number generator, with a client account credential, such as the password being the seed. In this manner, the unique client key UCK can be consistently generated across various devices on which a client account exists. Although the unique client key UCK is unique to a client account, in variations it may vary in time or based on changes to the client account credentials, for example.

In order to be able to use different shared symmetric keys with different messages or sets of messages, a method is provided for generating and sharing shared keys between two client accounts. Accordingly, a shared symmetric key SSK once generated by a client account is shared with just one other client account and used for encrypting messages keys sent from that other account to the client account that generated the symmetric shared key SSK. In variations, the shared symmetric key can be shared with a set of other client accounts.

In some implementations, a public key PuK associated with a recipient client account can also be used, by another client account, to encrypt at least portions of a message destined to the recipient client account, in addition to the use of a shared symmetric key. Moreover, the public key PuK can be included, by the other client account, as part of the message prior to sending the message to the recipient client account. In these implementations, the other client account can receive the public key PuK from the public key server 112, which is described in greater detail below. The public key PuK can be encrypted, for example with the previously received shared symmetric key SSK, by the other client account, prior to inclusion in the message. Accordingly, when the recipient client account receives the message, it can decrypt the public key PuK using the shared symmetric key SSK, and identify the private key PrK corresponding to the public key PuK. In some variations and enhanced public key may be used such that the private key PrK corresponding to the public key PuK may be included as part of the enhanced public key, in an encrypted form, as described below in greater detail. Subsequently, the portions of the message encrypted with the public key PuK can be decrypted using the corresponding private key PrK. In variations at least some portions of the message may be encrypted using both the shared symmetric key SSK and the public key PuK. In variations, a different public key PuK may be obtained for encrypting each new message or a set of new messages created based on the use of an enhanced public key. Limiting the use of a public key PuK to the encryption of one or a set of messages limits any compromises due to the breach of a public/private key pair to one or a set of messages encrypted by that breached public key. Moreover, use of both a changing shared symmetric key and a changing asymmetric key also increases the security of message exchange and addresses issues such as the-man-in-the-middle problem.

In order to be able to use different public keys with different messages, a method is provided for generating and sharing multiple enhanced public keys associated with each client account. Accordingly, in variations, each client account can generate more than one public/private asymmetric key pair. The enhanced public keys generated by a client account can be uploaded to the public key server 112 and stored there in association with that client account. Subsequently, any client account can request an enhanced public key associated with a client account as new messages are being exchanged. In variations, the generated enhanced public keys can include a portion of data such that the public key server can verify that an enhanced public key being provided to it and to be associated with a client account is indeed generated by that client account. Moreover, the enhanced public key can also include a second data portion such that a client account uploading a new enhanced public key to a public key server 112 can verify that the public key server 112 is authentic (as opposed to, for example an interceptor attempting to compromise the public keys).

In some further implementations, at least a portion of a message can be encrypted by a symmetric message key MK. The portion encrypted by the MK can be, for example, the message content or other message data. MK can be generated by the client account sending the message, and included in the message. MK can be encrypted by the SSK and/or PuK of the client account to which the message is being sent.

Figure 2:
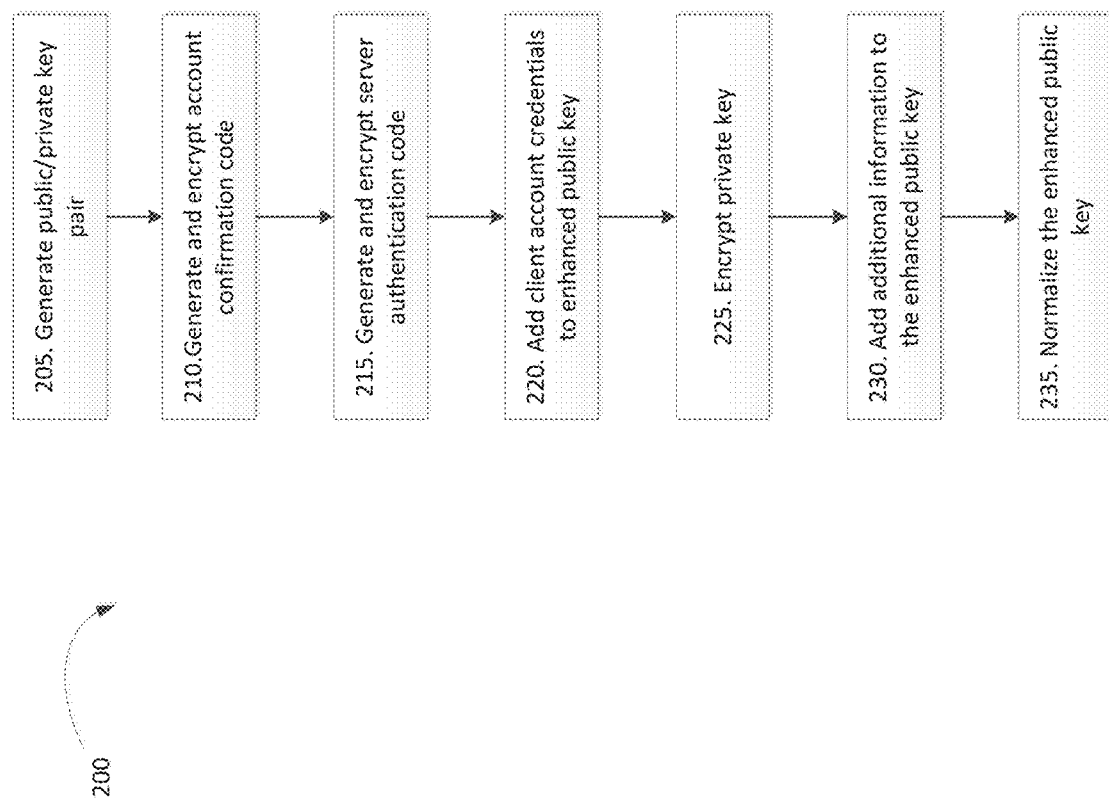
FIG. 2 shows a method of providing an enhanced public key for securing communications of the system of FIG. 1 in accordance with an implementation.

Referring now to FIG. 2, a method of providing an enhanced public key for securing system communication is indicated generally at 200. In order to assist in the explanation of the method, it will be assumed that method 200 is operated using system 100 as shown in FIG. 1. Additionally, the following discussion of method 200 leads to further understanding of system 100. However, it is to be understood that system 100, and method 200 can be varied, and need not work exactly as discussed herein in conjunction with each other, and that such variations are within scope.

Figure 3:
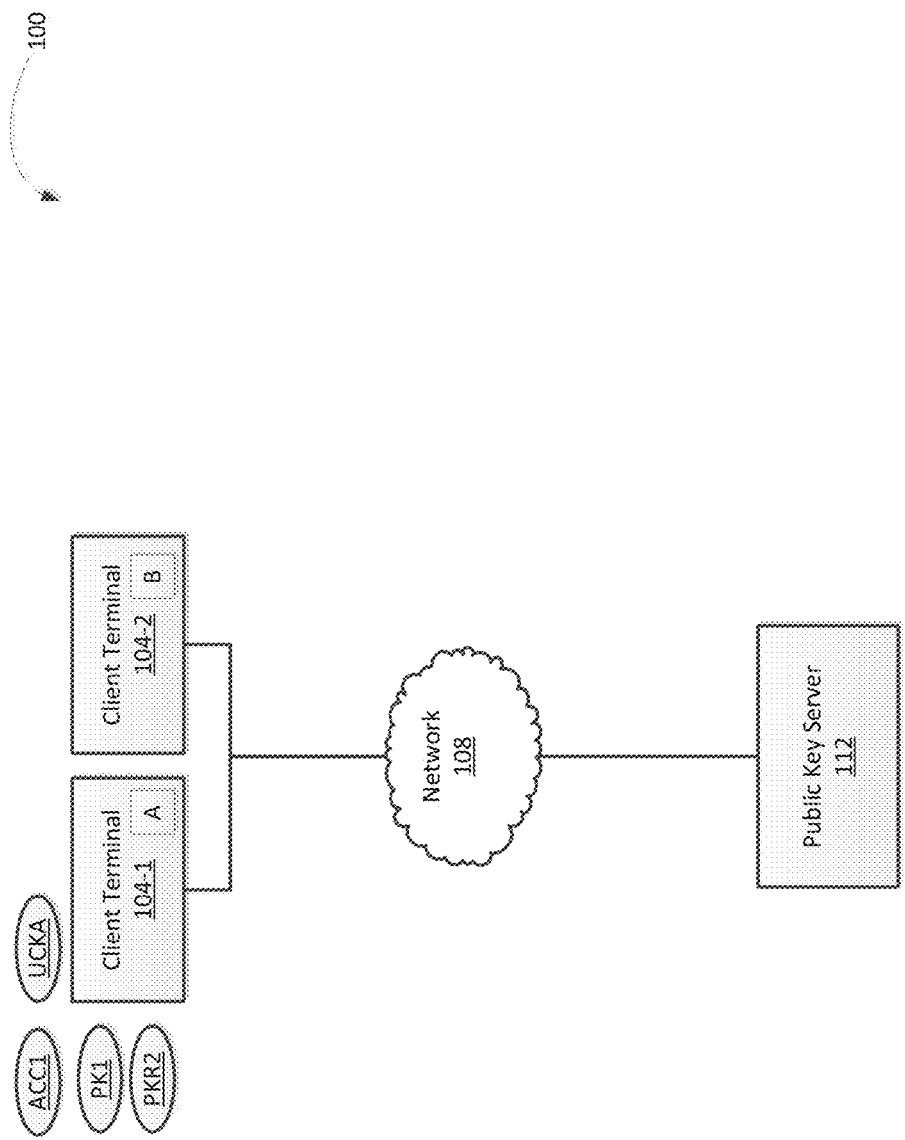
FIG. 3 shows a block diagram of the system of FIG. 1 in the process of performing the method of FIG. 2 in accordance with an implementation.

Beginning at 205, a set of public/private key pairs are generated by a client account at a secure communications terminal 104. In the present example of FIG. 1, the client account A generates one public/private key pair comprising an asymmetric public key PK1 and an asymmetric private key PKR1 respectively as shown in FIG. 3 in accordance with known methods of asymmetric key generation. Moreover, the secure communications terminal 104-1 maintains a previously generated unique client key UCKA unique to client A. The unique client key UCKA can be generated based on a random number generator using a credential of the client account A, such as its password.

Figure 4:
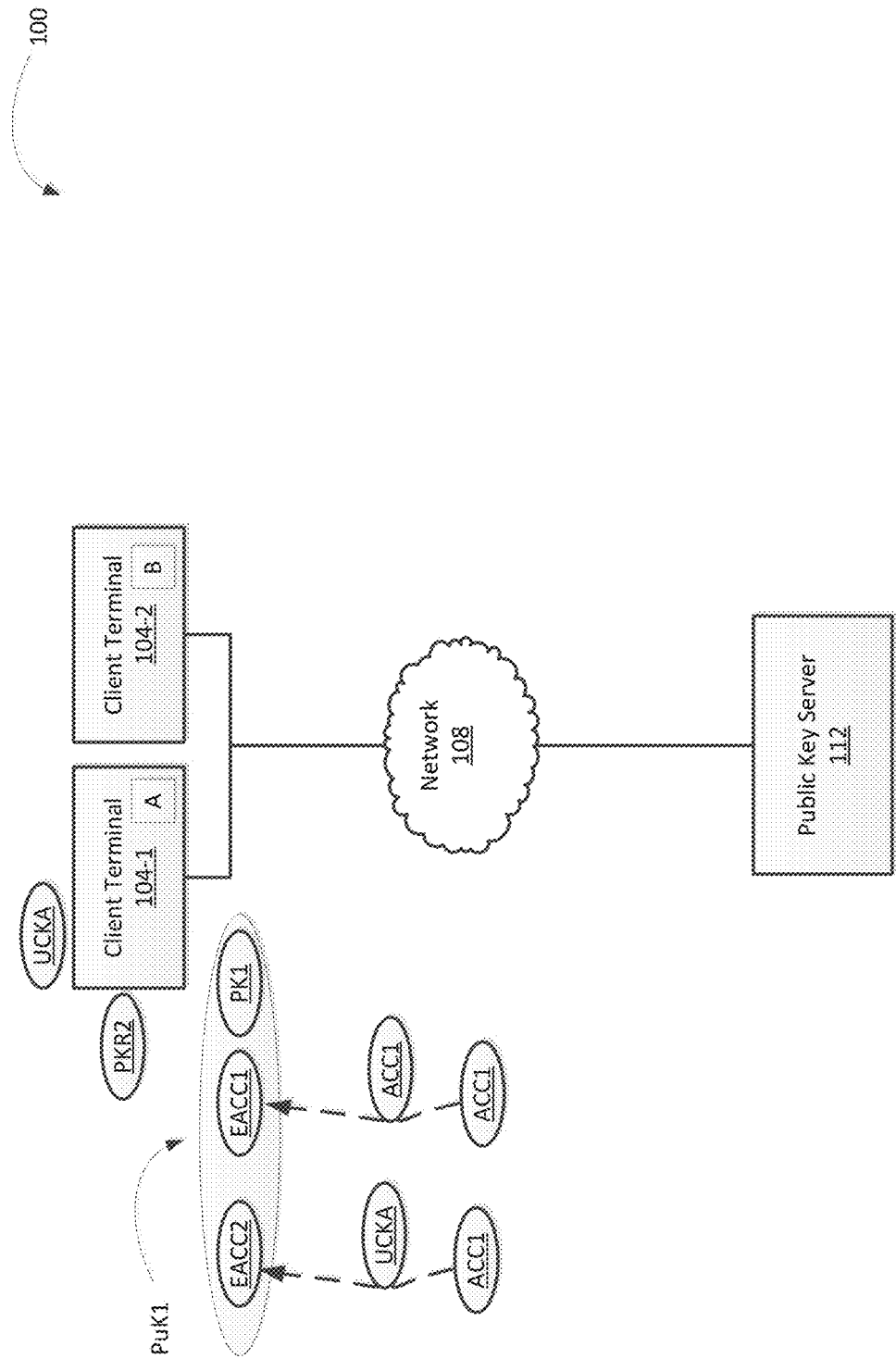
FIG. 4 shows a block diagram of the system of FIG. 1 in the process of performing the method of FIG. 2 in accordance with an implementation.

Continuing with the method 200 at 210, as well as FIG. 3, an account confirmation code is also generated and encrypted. For example, a random number generator can be used to generate the account confirmation code ACC1. The account confirmation code ACC1 can be used by the public key server 112 to verify that the client account sending a new public key is indeed the client account that the public key is to be associated with. The account confirmation code ACC1 can be encrypted by itself, resulting in a first encrypted form of the account confirmation code ACC1 (EACC1). Moreover, as shown in FIG. 4, the account generation code ACC1 can also be encrypted with the unique client key UCKA resulting in a second encrypted form of the account authentication code ACC1 (EACC2). Subsequently the first encrypted account authentication code EACC1 and the second encrypted account authentication code EACC2 can be combined with asymmetric public key PK1 as part of forming an enhanced version of the public key, the enhanced public key PuK1. The process of combining can take various forms, such as concatenation, for example.

Figure 5:
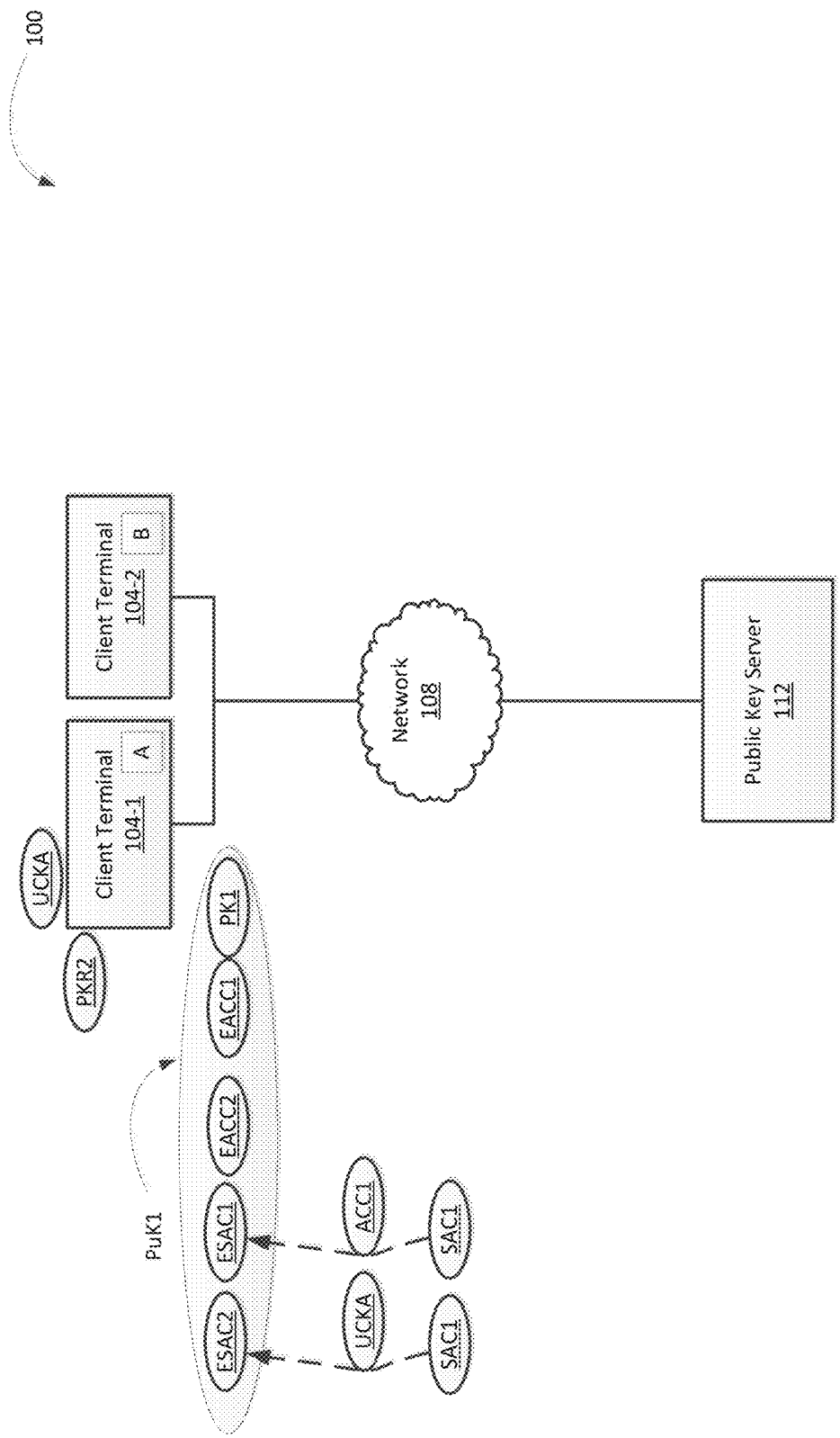
FIG. 5 shows a block diagram of the system of FIG. 1 in the process of performing the method of FIG. 2 in accordance with an implementation.

Referring back to FIG. 2, at 215, a server authentication code (SAC1) is generated using, for example, a random number generator, and encrypted. The server authentication code SAC1 can be used by the client account A, for example, to confirm that the public key server is authentic. The server authentication code SAC1 can be encrypted by the account authentication code ACC1, resulting in a first encrypted form of the server authentication code SAC1 (ESAC1). Moreover, SAC1 can also be encrypted with the unique client key UCKA resulting in a second encrypted form of the SAC1 (ESAC2). Subsequently the first encrypted form of the SAC1, ESAC1 and the second encrypted form of the SAC1, ESAC2 can be combined with the rest of the contents of the enhanced public key PuK1 as shown in FIG. 5. The act of combining can take various forms, such as concatenation, for example.

Figure 6:
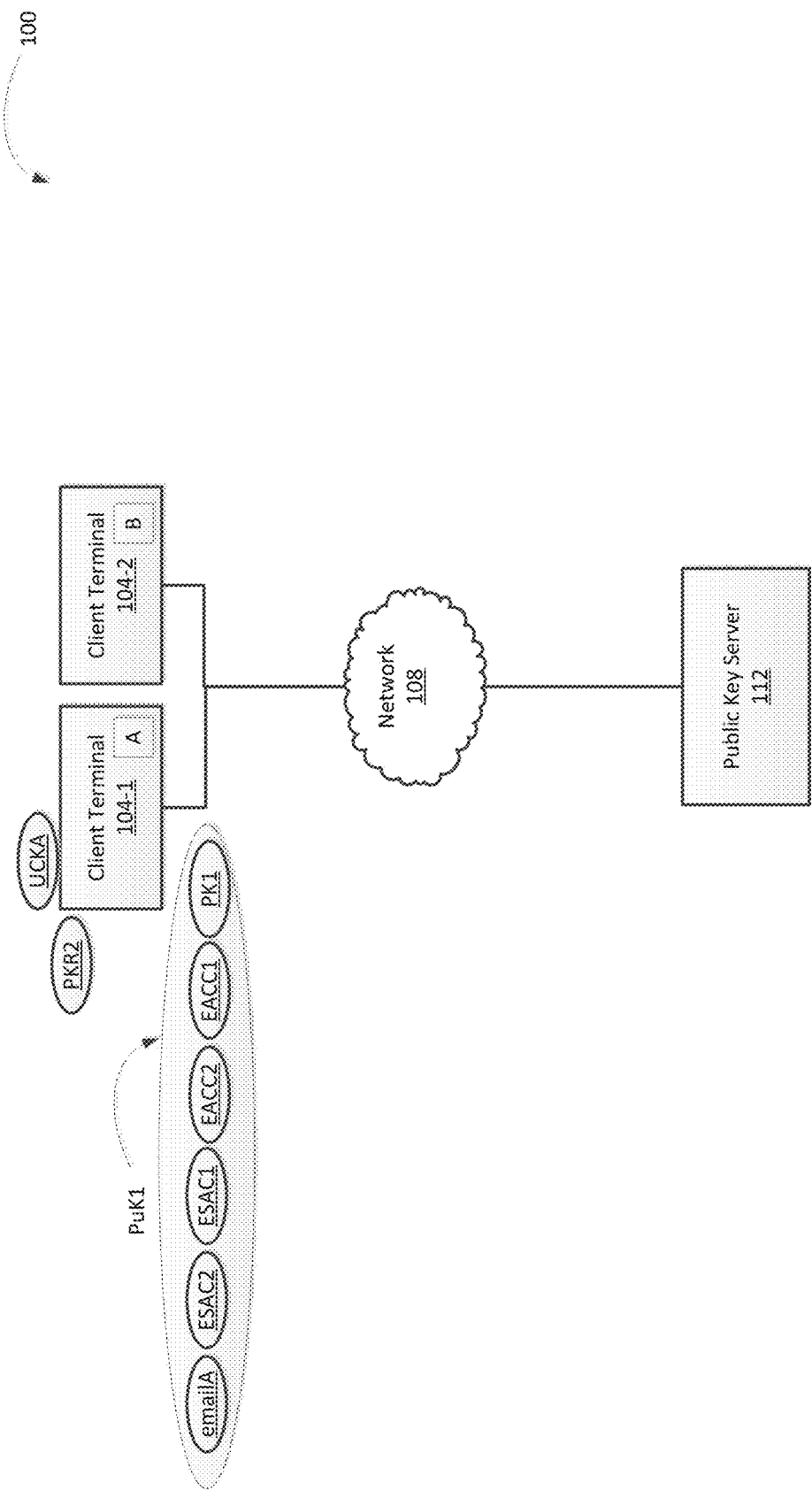
FIG. 6 shows a block diagram of the system of FIG. 1 in the process of performing the method of FIG. 2 in accordance with an implementation.

Continuing the method 200, at 220, client account credentials are added to the enhanced public key. For example, an email address (emailA) that was used to create client account A can be added to the enhanced public key PuK1, as shown in FIG. 6. In some variations, the credentials can be encrypted.

Figure 7:
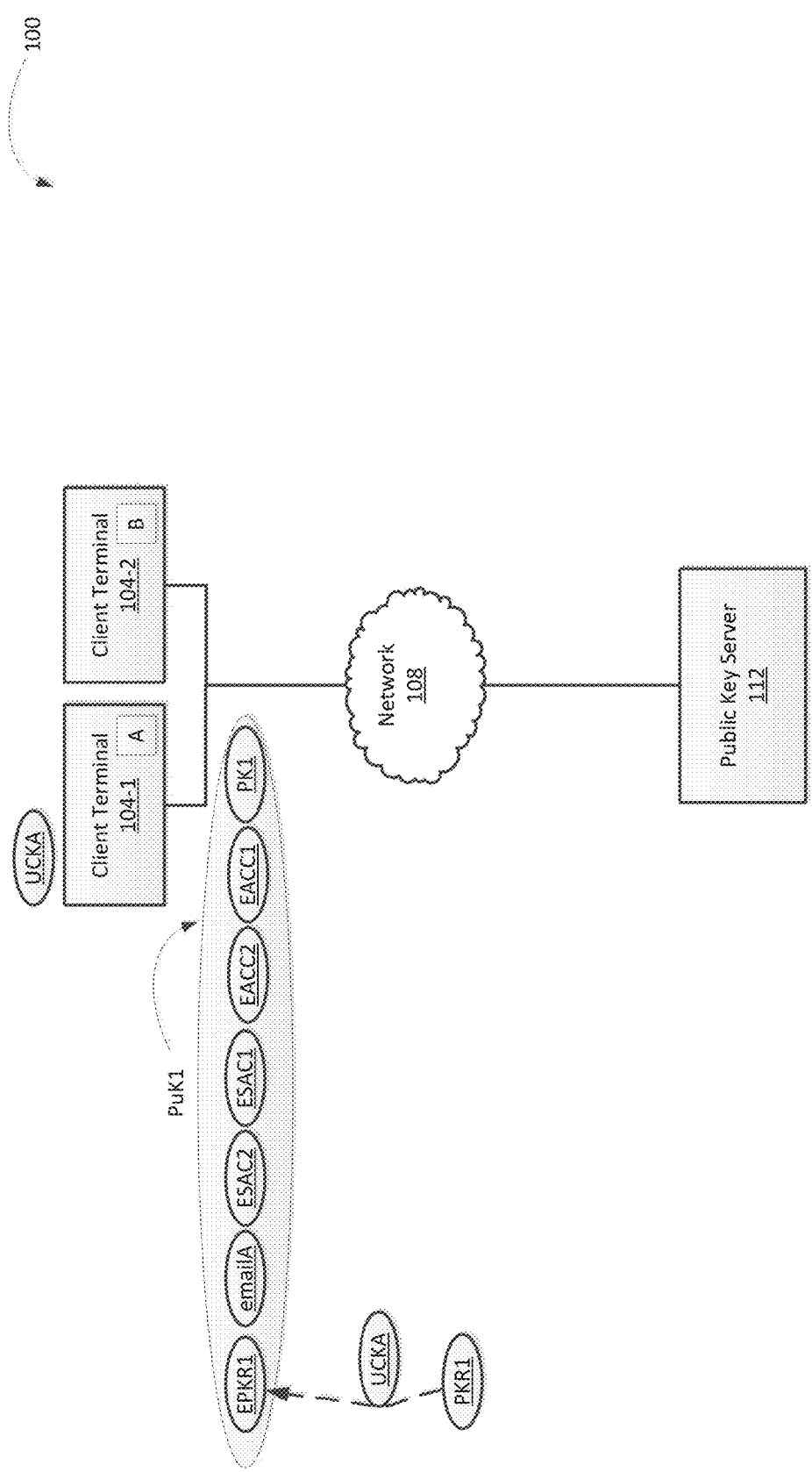
FIG. 7 shows a block diagram of the system of FIG. 1 in the process of performing the method of FIG. 2 in accordance with an implementation.

Continuing with the method 200, at 225, the private key PKR1 corresponding to the public key PK1, generated at 205 is encrypted using the unique client code UCKA, to generate an encrypted form of the private key (EPKR1). The encrypted form of the private key EPKR1 is subsequently added to the enhanced public key PuK1 as shown in FIG. 7. By including the encrypted version of the private key PKR1, a client account can be relieved from maintaining the private key on a secure communications terminal 104.

Figure 8:
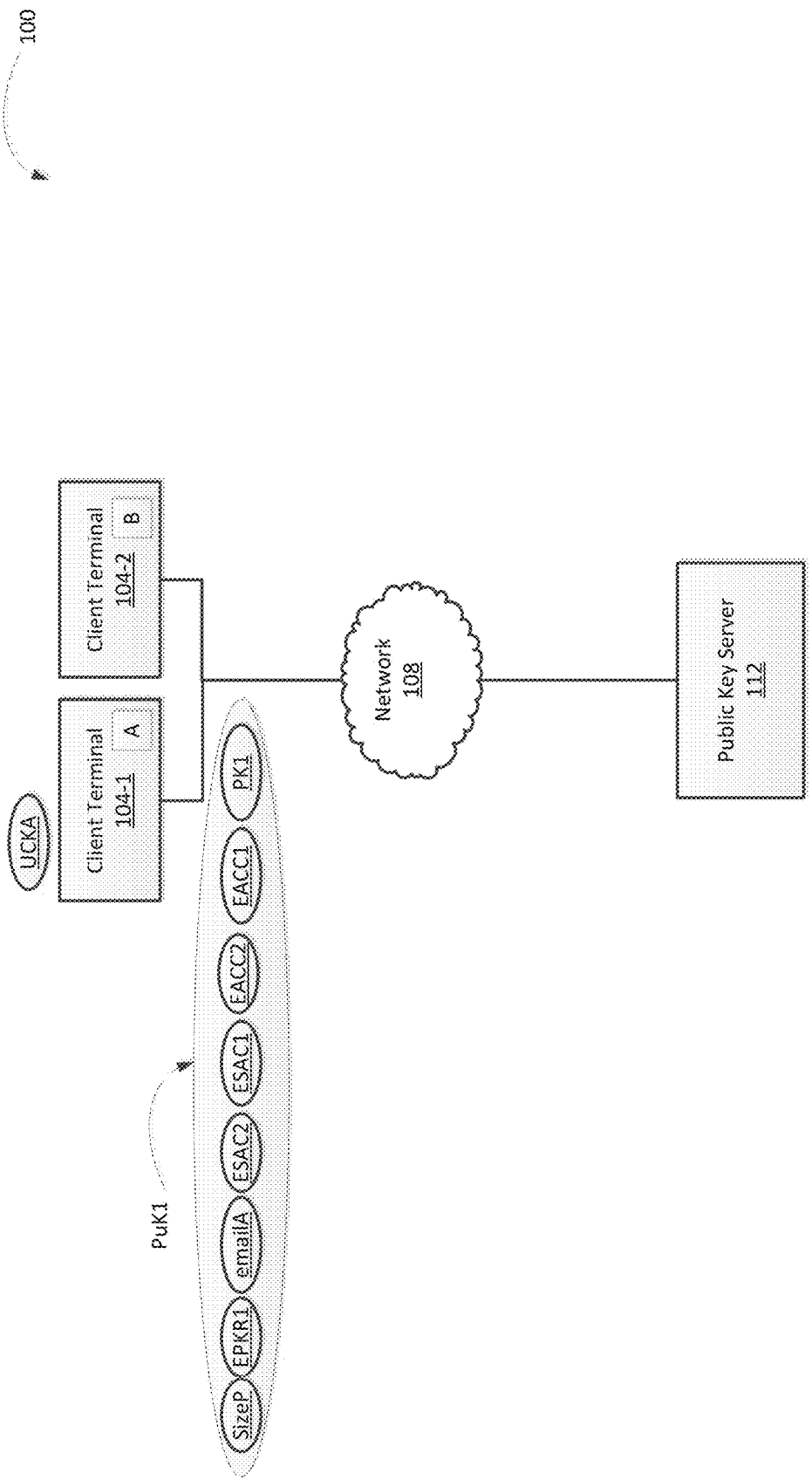
FIG. 8 shows a block diagram of the system of FIG. 1 in the process of performing the method of FIG. 2 in accordance with an implementation.

Referring back to FIG. 2, at 230, additional information can be added to the enhanced public key PuK1. For example, a version number of the public key generator used to generate the enhanced public key can be appended to the enhanced public key Puk1. Alternatively, or in addition, a date of generation on the enhanced public key PuK1, and an expiration date of the enhanced public key PuK1 can also be appended. Moreover, the size SizeP, in bits for example, of the asymmetric public key PK1 can also be included in the enhanced public key PUK1, as shown in FIG. 8, which in this case is 512 bits.

Continuing with the method 200, at 235 the enhanced public key is normalized. The normalization allows the enhanced public key to be utilized in accordance with existing asymmetric public key standards. To perform the normalization, the data combined to from the enhanced public key PuK1 is split into rows having a bit length equal to the sizeP field in the PuK1, which in this example is 512 bits. In this example, the enhanced public key is split into three rows, R1, R2, and R4. The row R1 includes the size of the asymmetric public key SizeP, the encrypted private key EPKR1 corresponding to the asymmetric public key PK1 and the email address emailA for the client account A. The row R2, on the other hand includes the second encrypted server authentication code ESAC2, the first encrypted server authentication code ESAC1, the second encrypted account confirmation code EACC2 and the first encrypted account confirmation code EACC1. The row R4 includes the asymmetric public key PK1. Row one is reserved for the normalization process which is discussed next. It should be noted that although in this example, the information thus far included in PuK1 formed exactly three rows of 512 bits, in variations, they may form more or fewer than two rows. Moreover, in further variations, there may be at least one row which has fewer than 512 bits. In such cases, the row with fewer than 512 bits may be padded to 512 bits using zeros. It should also be noted that the exact order of the information included in the enhanced public key PuK1 as well as the rows is not material and in different implementations, the order can vary.

Figure 10:
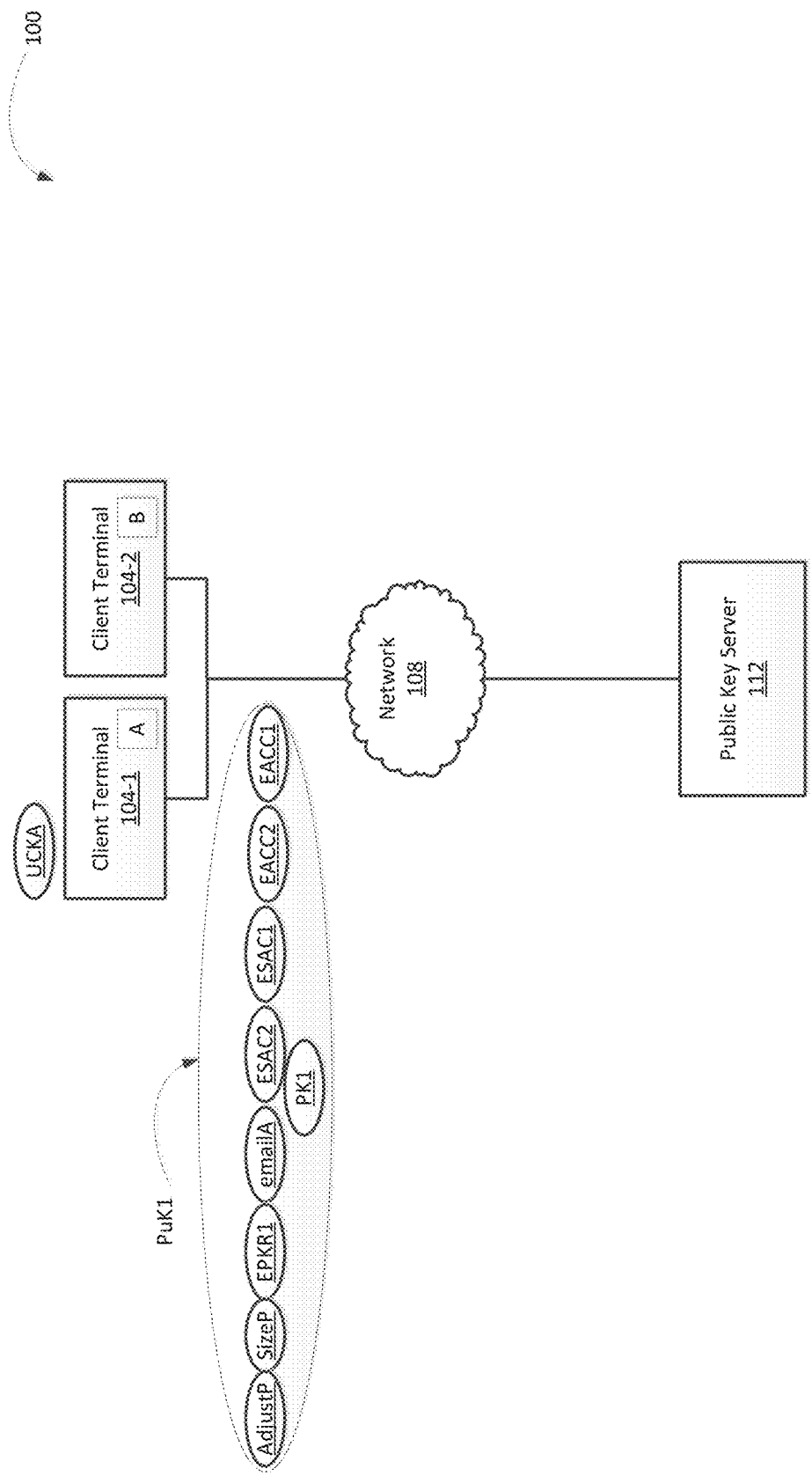
FIG. 10 shows a block diagram of the system of FIG. 1 in the process of performing the method of FIG. 2 in accordance with an implementation.

To perform the normalization the three rows R1, R2 and R4 are combined with an adjustment row R3 to form a matrix 900. Row R3, includes an adjustment value AdjustP. The adjustment value AdjustP is determined on the basis of the information included in the enhanced public key PuK1, including the asymmetric public key PK1. For example, in this example, the adjustment value AdjustP can be calculated by determining the exclusive-or of the rows R1 and R2, the result of which is exclusive-ored with the row R4. The determined adjustment value AdjustP is then added to the enhanced public key PuK1, as shown in FIG. 10. In some variations, a hash of the enhanced public key can be generated and included in the enhanced public key providing an additional error checking mechanism.

Figure 9:
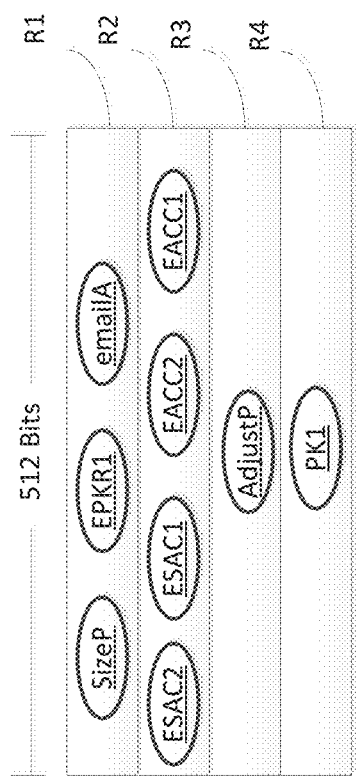
FIG. 9 shows a block diagram of an enhanced public key in the process of being normalized in accordance with an implementation

In subsequent use of the enhanced pubic key PuK1, to encrypt any data based on it, the asymmetric public key PK1 can be determined based on the adjustment value AdjustP and the rest of the information included in the enhanced public key PuK1. For example, in this case, referring back to FIG. 9, to encrypt data with the enhanced public key PuK1, a matrix 900 can be once again constructed from the enhanced public key PuK1, and the rows R1 and R2 exclusive-ored, and the result further exclusive-ored with the adjustment value AdjustP to obtain the asymmetric public key PK1, which is subsequently used to encrypt the data. Moreover, to decrypt data encrypted with the asymmetric public key PK1, obtained from the enhanced public key PuK1, the corresponding private key PKR1 does not have to be stored at client account A as long as the enhanced public key PuK1 is communicated to the client account A along with the encrypted data. This is because the enhanced public key PuK1 includes corresponding private key PKR1.

Figure 11:
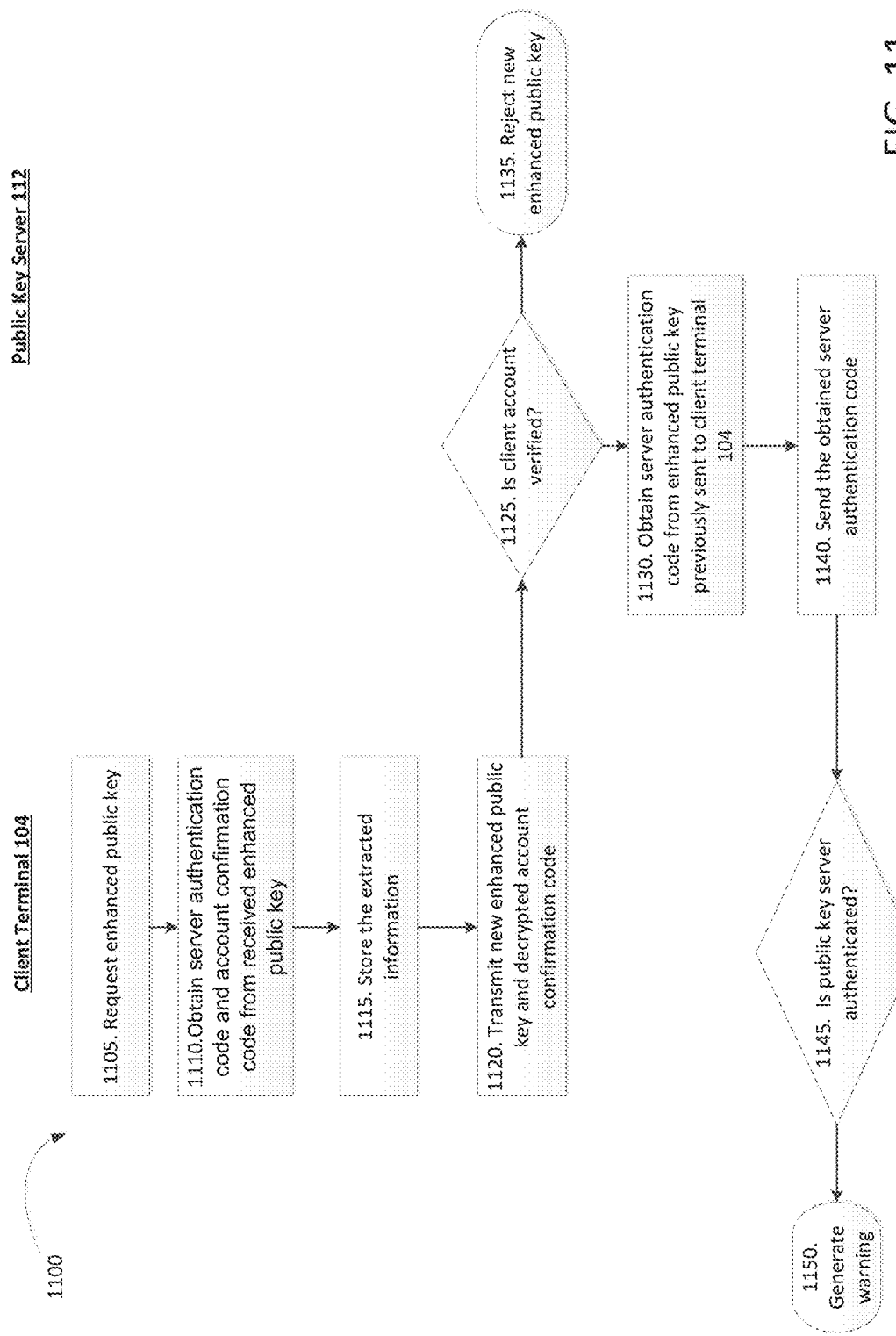
FIG. 11 shows a method of public key addition by the system of FIG. 1 in accordance with an implementation.

Once the enhanced public key PuK1 is generated at a secure communications terminal 104, it is communicated to the public key server 112 so that it can be made available to other client accounts such as client account B. Referring now to FIG. 11, a method of public key addition is indicated generally at 1100. In order to assist in the explanation of the method, it will be assumed that method 1100 is operated using system 100 as shown in FIG. 1. Additionally, the following discussion of method 1100 leads to further understanding of system 100. However, it is to be understood that system 100, and method 1100 can be varied, and need not work exactly as discussed herein in conjunction with each other, and that such variations are within scope.

Figure 12:
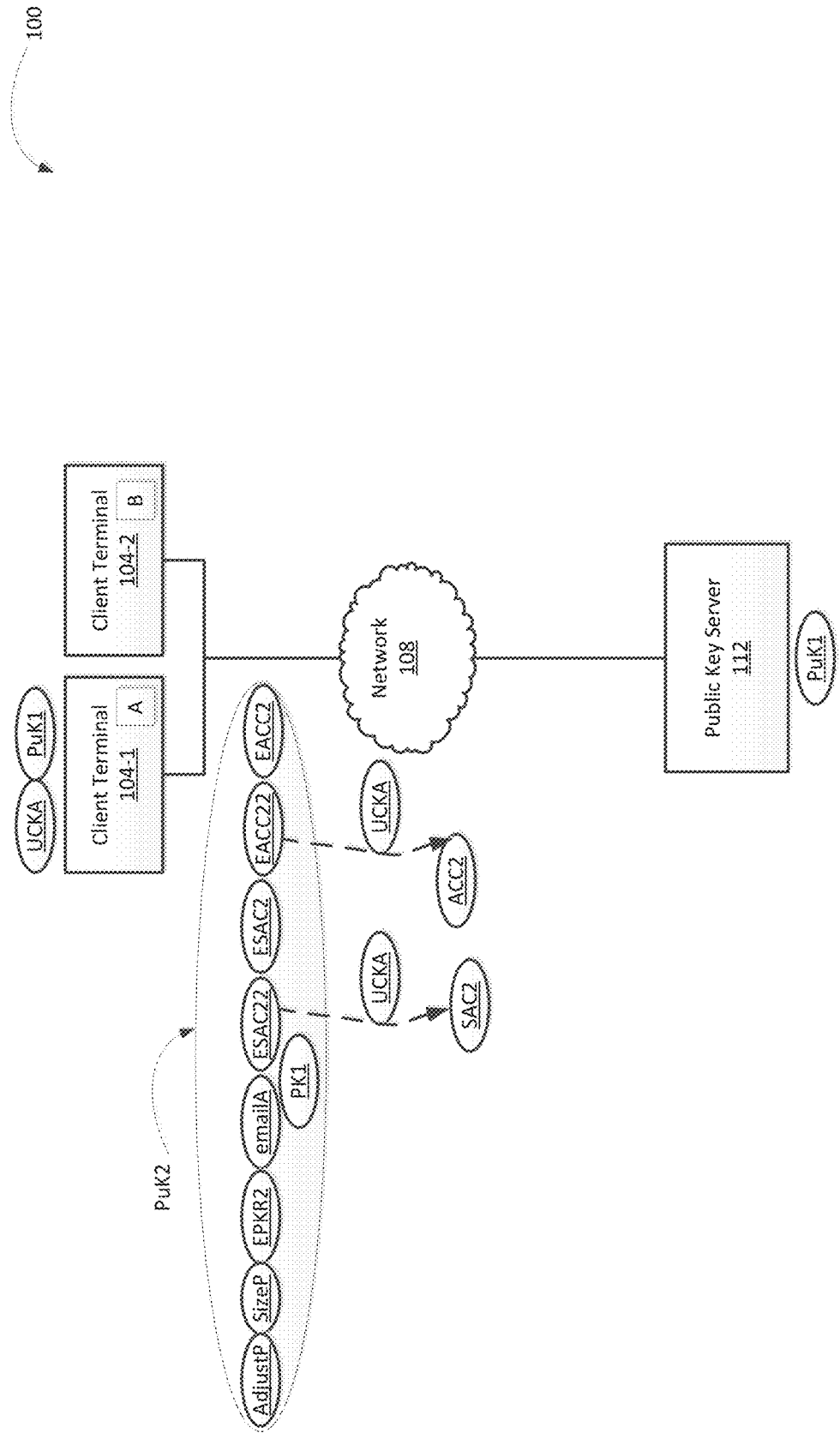
FIG. 12 shows a block diagram of the system of FIG. 1 in the process of performing the method of FIG. 11 in accordance with an implementation.

Beginning at 1105, the client account A, through secure communications terminal 104-2, accesses public key server 112 using the communications interface of the secure communications terminal 104-2, and requests a current enhanced public key associated with the client account A. Upon receiving the current enhanced public key PuK2, which was generated previously in accordance with the method 200 and uploaded to the public key server 112 through a previous performance of the method 1100, the server authentication code SAC2 and the account confirmation code ACC2 are obtained from the current enhanced public key PuK2. Specifically, as shown in FIG. 12, the second encrypted server authentication code ESAC22 and the second encrypted account confirmation code EACC22 are extracted from the enhanced public key PuK2 and decrypted to obtain the server authentication code SAC2 and the account confirmation code ACC2 respectively using the unique client key UCKA of the client account A. It will now be understood by those of skill that only client account A is equipped to perform this decryption since the unique client key UCKA of the client account A is not shared with any other client accounts.

Figure 13:
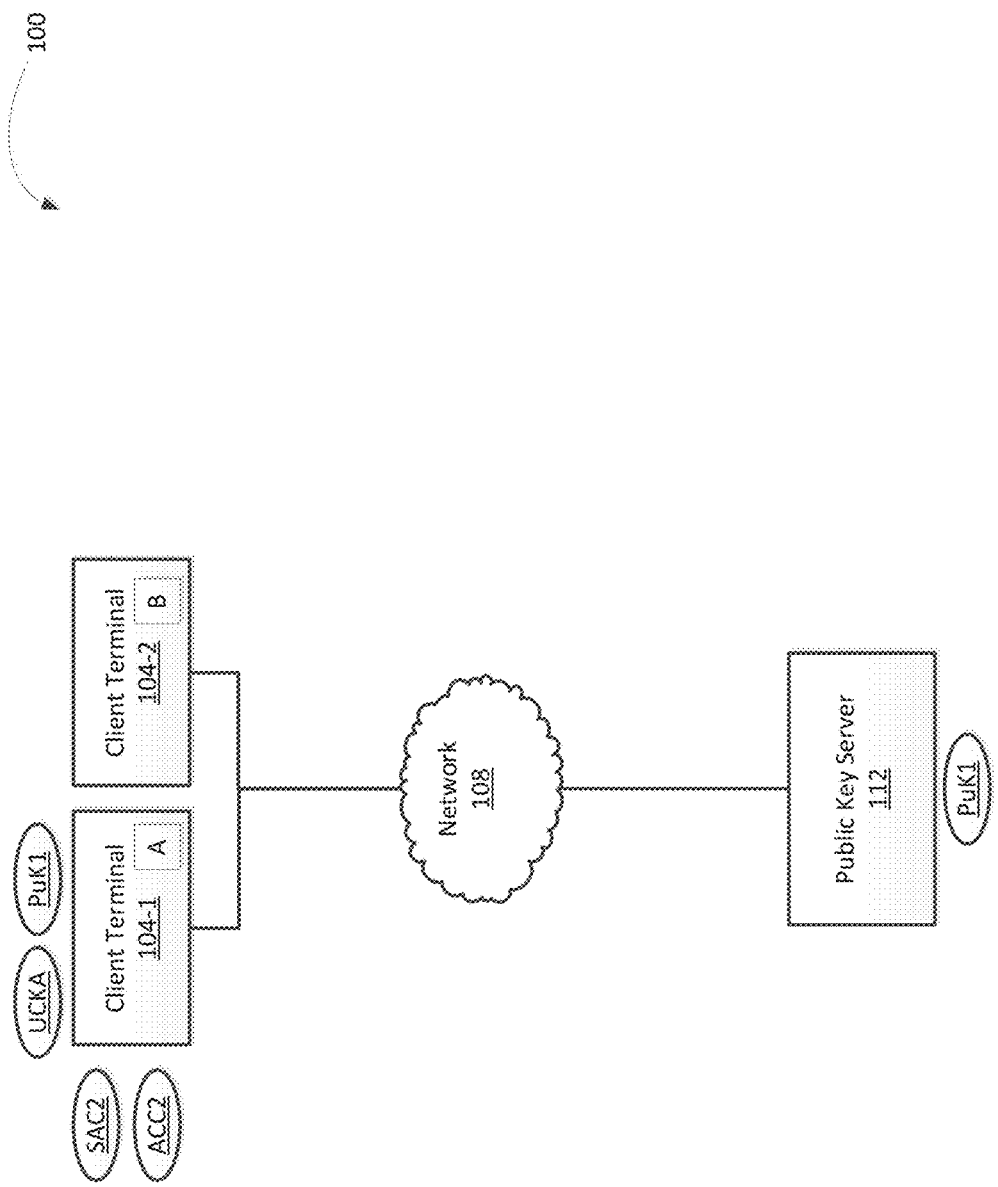
FIG. 13 shows a block diagram of the system of FIG. 1 in the process of performing the method of FIG. 11 in accordance with an implementation.
Figure 14:
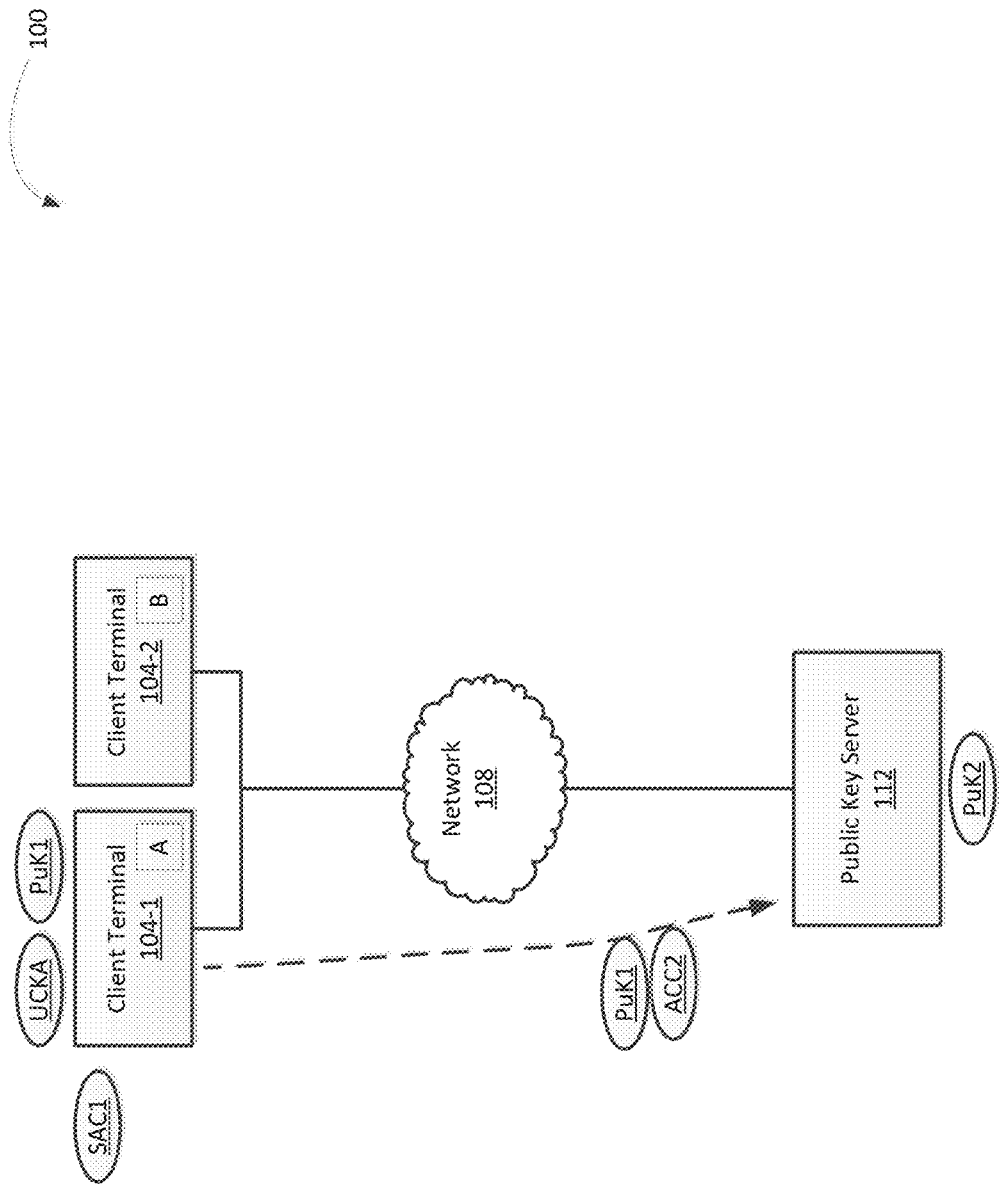
FIG. 14 shows a block diagram of the system of FIG. 1 in the process of performing the method of FIG. 11 in accordance with an implementation.
Figure 15:
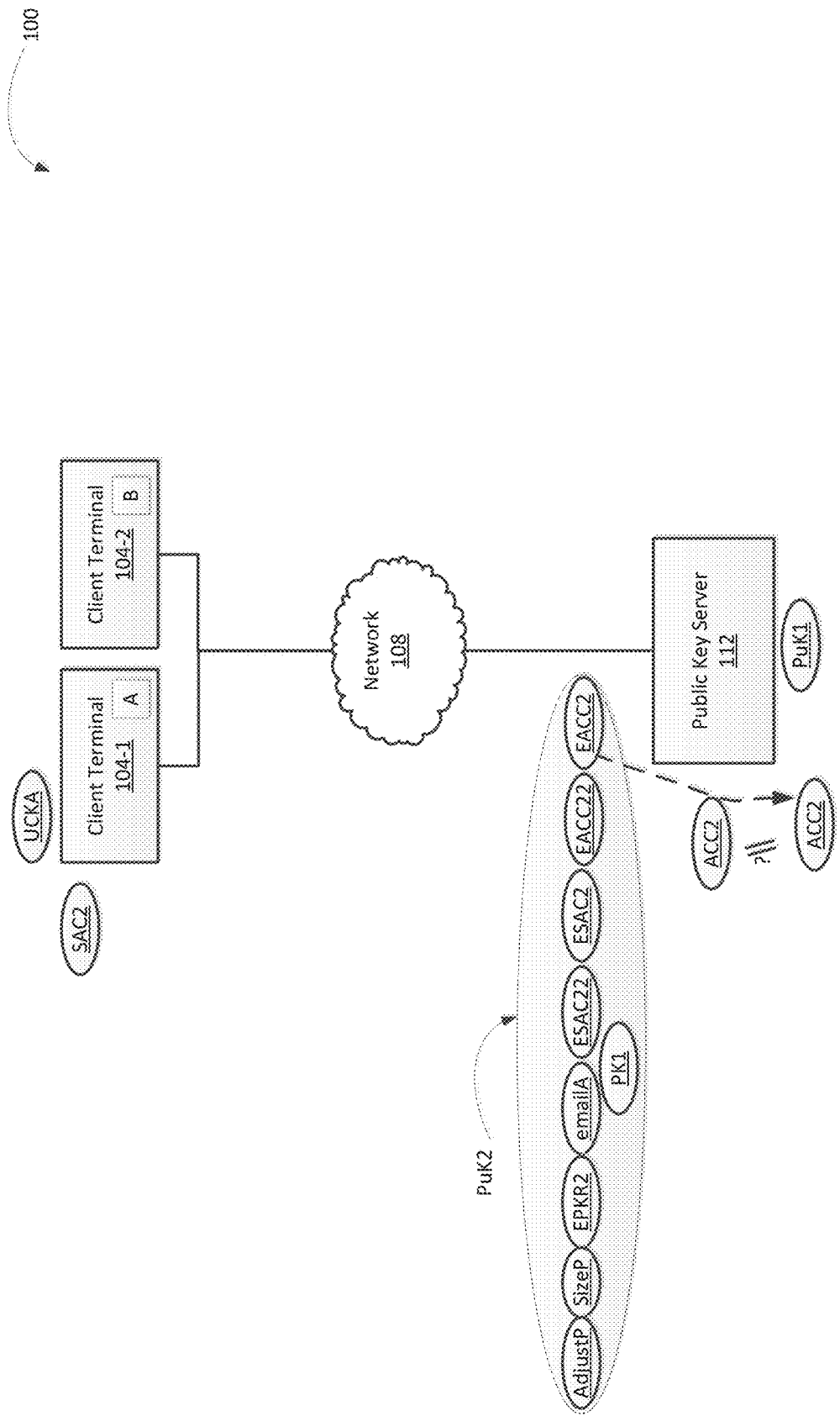
FIG. 15 shows a block diagram of the system of FIG. 1 in the process of performing the method of FIG. 11 in accordance with an implementation.

Once the server authentication code SAC2 and the account confirmation code ACC2 are obtained from the enhanced public key PuK2, they are stored in secure communications client 104-1, as shown in FIG. 13. Continuing with the method 1100, at 1120 the account confirmation code ACC2 is transmitted to the public key server 112 along with the new enhanced public key PuK1, as shown in FIG. 14. At 1125, the public key server 112 verifies the client account. For example, as shown in FIG. 15, the public key server 112 extracts from the current enhanced public key PuK2, information comprising the first encrypted account confirmation code EACC2 and decrypts the extracted information using the received account confirmation code ACC2. It will now occur to those of skill that since the received account confirmation code ACC2 was originally first encrypted using the account confirmation code ACC2 itself as a key, only when the client account supplying the comparison key at 1120 is the same as the client account that supplied the current enhanced public key will the decryption of the first encrypted account confirmation code EACC2 be successful. Accordingly, when the account confirmation code obtained by decrypting EACC2 matches the received account confirmation ACC2, the client account is verified and the new public key is accepted. Thus the method 1100 moves to 1130. When, on the other hand, the account confirmation code obtained by decrypting EACC1 does not match the received account confirmation ACC1, then the method 1100 moves to 1135 rejecting the new enhanced public key PuK2.

Figure 16:
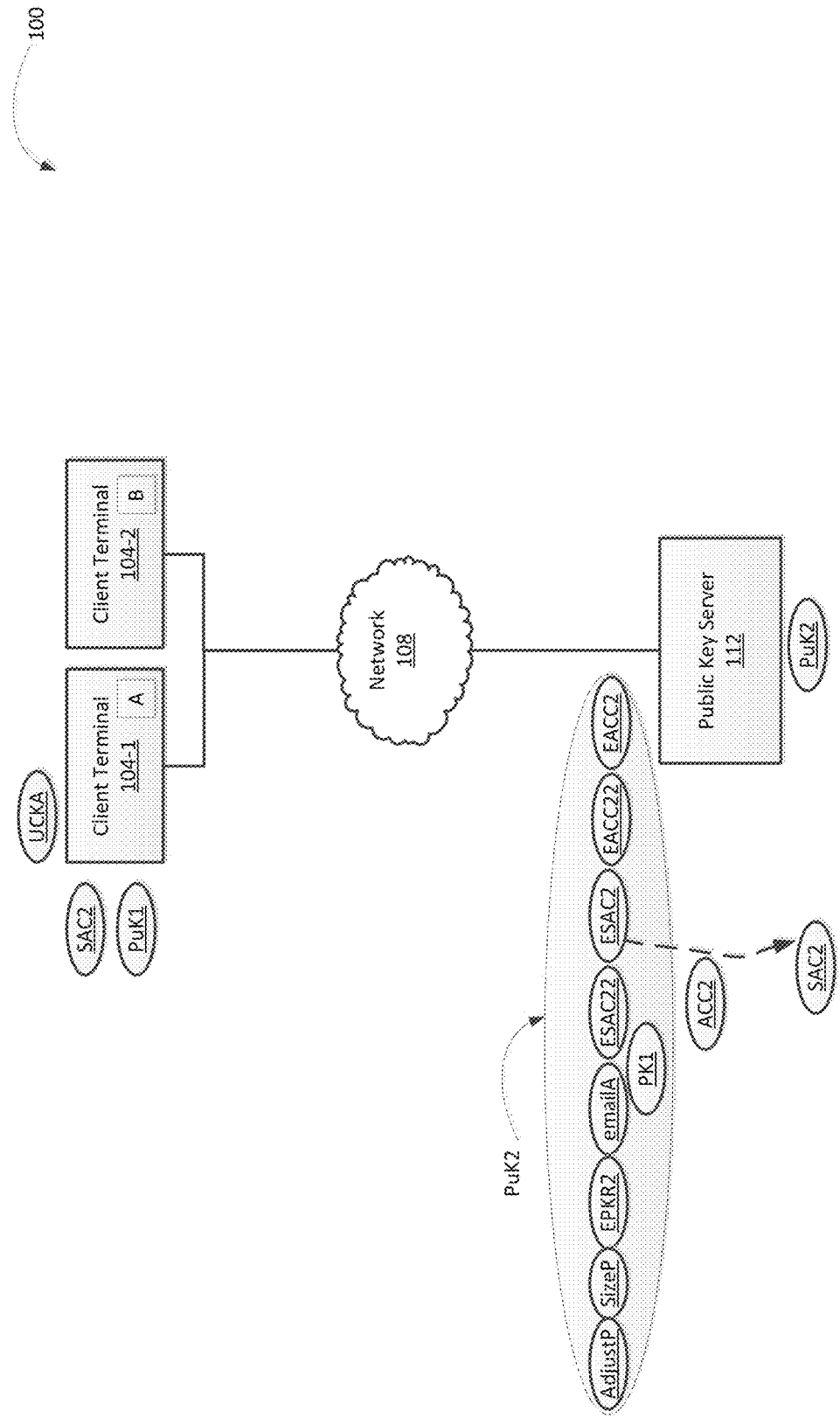
FIG. 16 shows a block diagram of the system of FIG. 1 in the process of performing the method of FIG. 11 in accordance with an implementation.

Continuing with FIG. 11, at 1135 the authentication of the public key server 112 by a secure communications terminal 104 is initiated, at the public key server 112, by obtaining the server authentication code from the enhanced public key that was provided to the secure communications terminal 104-1. Specifically, as shown in FIG. 16, the public key server 112 obtains the server authentication code SAC2 by extracting the first encrypted server authentication code ESAC2 from the current enhanced public key PuK2 and decrypting the first encrypted server authentication code ESAC2 using the account confirmation code ACC2.

Figure 17:
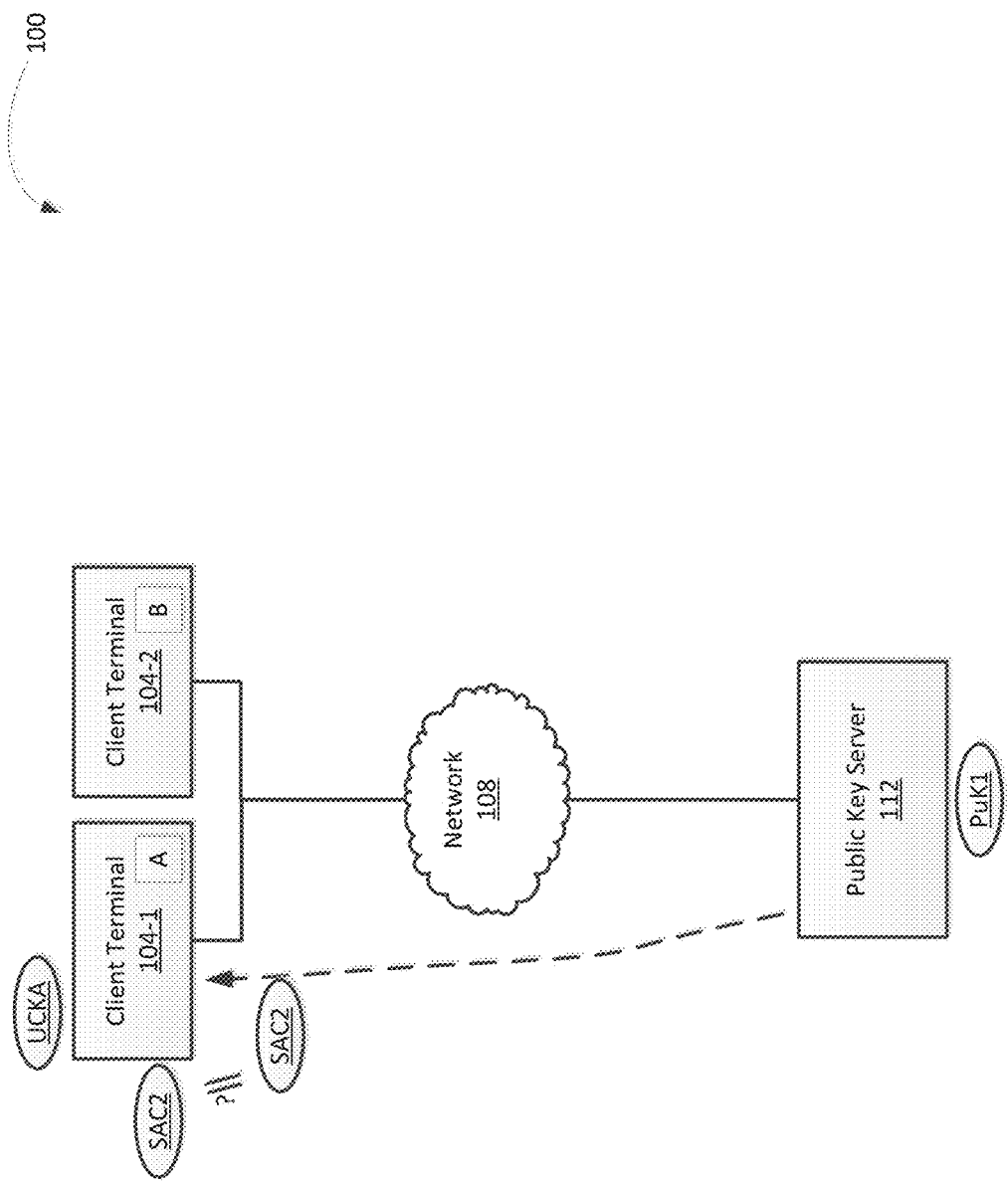
FIG. 17 shows a block diagram of the system of FIG. 1 in the process of performing the method of FIG. 11 in accordance with an implementation.

At 1140, the server authentication code SAC2 extracted from the current enhanced public key PuK2 is sent to the secure communications terminal 104-1, through a communication interface of the public key server 112, as shown in FIG. 17. At 1145, the authenticity of the public key server 112 is verified based on the received server authentication code. Specifically, the received server authentication code SAC2 is compared to the server authentication code SAC2 that was obtained at 1110. When the compared codes match, then the authenticity of the server is verified and further action is not taken. When, on the other hand, the compared codes do not match, then it is determined that the public key server 112 is not authentic and warnings are generated at 1150. In variations, the server authentication code SAC2 can be obtained from the current enhanced public key PuK2 at this point rather than at 1110.

In variations, the method of public key addition can be repeated as many times as desired, and the multiple enhanced public keys thus added to the public key server 112 can be buffered at the server 112. The size of the buffer may vary. Moreover, the public key server 112 may provide each enhanced public key once, or a limited number of times, before deleting it or otherwise marking it as unavailable for public provision. In some variations, an enhanced public key may expire if not used after a predetermined period of time. The expiration date or period may be included in each enhanced public key, or may be determined as a policy of the public key server 112. In further variations, where for example, only one enhanced public key is maintained by the public key server 112, method 1100 can be used to change that enhanced public key as opposed to adding to it.

Figure 18:
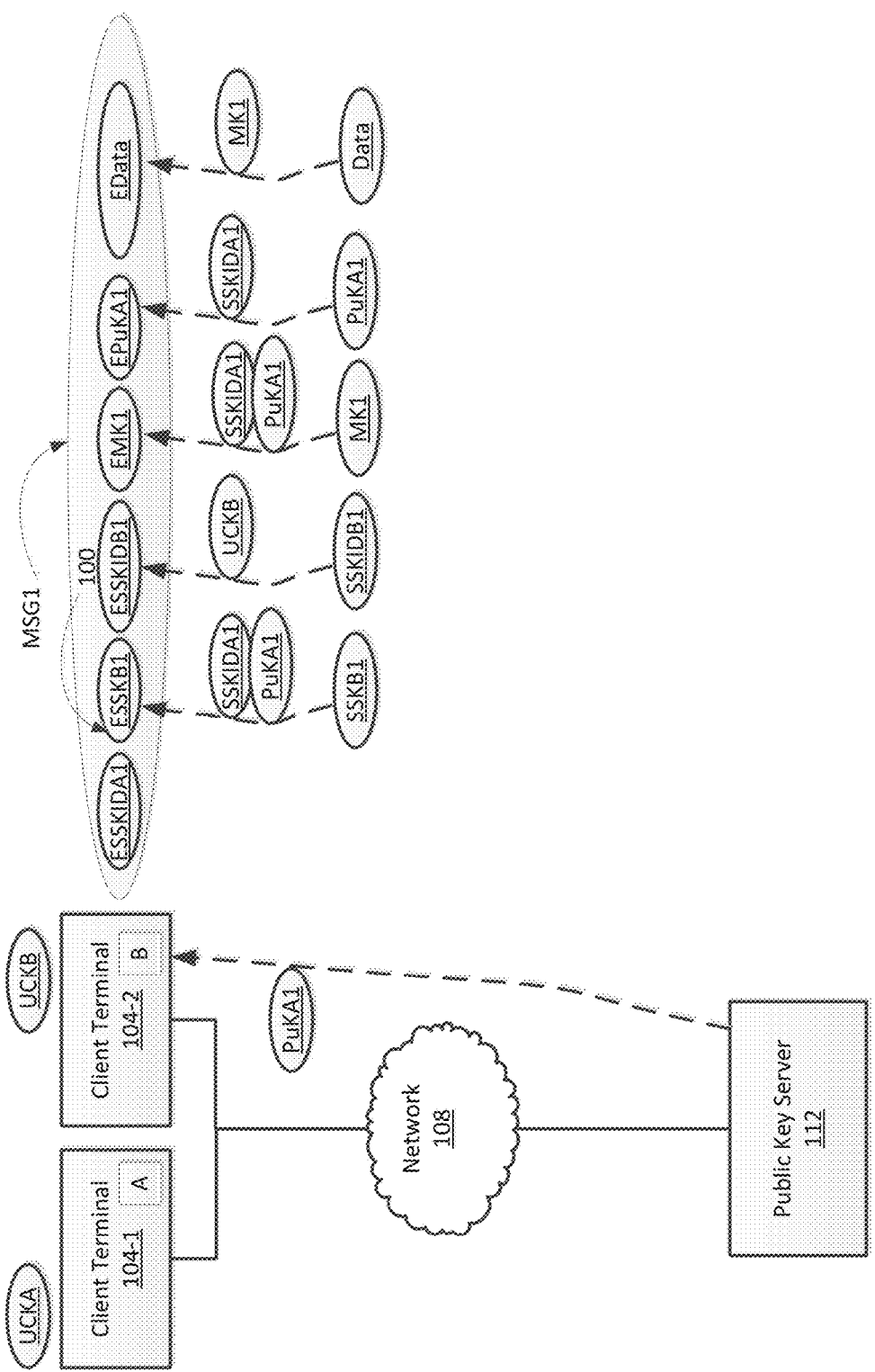
FIG. 18 shows a block diagram of the system of FIG. 1 including an example message in accordance with an implementation.

Once enhanced public keys for a client account are generated and made available through the public key server 112, a client account can engage in secure communications with other client accounts. For example secure communications can be sent and received from a secure communications terminal 104. In some variations, the communications can be in the form of sending and receiving messages. A message can include a number of different components. FIG. 18, shows a non-limiting illustrative example message including various components. The components of a message, the message MSG1, are assembled by client account B at secure communications terminal 104-2.

The example message MSG1 of FIG. 18 includes ESSKID1, an encrypted form of the symmetric shared key identifier SSKIDA1 that is the identifier for shared symmetric key SSKA1. The symmetric shared key identifier SSKIDA1, along with shared symmetric key SSKA1 are previously generated as a key pair by a secure communications terminal 104 associated with the client account A, the symmetric shared key identifier SSKIDA1 being encrypted using the unique client key UCKA for the client account A. The symmetric shared key can be generated based on any desired symmetric key generation method. The key pair (SSKA1 and ESSKIDA1) are then transmitted to the client account B as part of a previous message sent to the client account B, as an encrypted form of the symmetric shared key identifier SSKIDA2 and shared symmetric key SSKA2 in the manner described below in relation to the method 2500. By providing the key pair to the client account B, the client account A enables the client account B to subsequently encrypt a message to the client account A using the provided key pair. Accordingly, in this example message MSG1 of FIG. 18, the secure communications terminal 104-2, having received the key pair, encrypts a portion of the message MSG1 using the shared symmetric key SSKA1 and includes the encrypted symmetric shared key identifier ESSKIDA1 to identify that it was the shared symmetric key SSKA1 that was used to encrypt a portion of the message MSG1. It is to be noted that the key pair SSKIDA1 and SSKA1 were not necessarily generated at secure communications terminal 104-1, and thus could have been generated at any secure communications terminal 104 associated with the client account A. It is to be further noted that because the symmetric shared key identifier SSKIDA1 was encrypted using the unique client key UCKA, only the client account A has access to its unencrypted form, thus making it unlikely that any third party interceptor of the message MSG1 can gain access to the shared symmetric key SSKA1. Moreover, since only the client account A has the ability to decrypt the encrypted symmetric shared key identifier ESSKIDA1, and further, since the shared symmetric key SSKA1 is not included in the message MSG1 encrypted with the shared symmetric key SSKA1, the key pair ESSKIDA1 and SSKIDA1 can only be used to encrypt messages to the client account A, such as the message MSG1.

The example message MSG1 of FIG. 18 further includes the key pair ESSKB2 and ESSKIDB2, which are the encrypted form of the shared symmetric key SSKB1 and the symmetric shared key identifier SSKIDB1 for shared symmetric key SSKB1. The key pair is generated by the secure communications terminal 104-2, and is to be used by client account A for encrypting at least part of a message that will be send from the client account A to the client account B subsequent to the reception of the message MSG1. The encrypted shared symmetric key ESSKB1 is generated by the secure communications terminal 104-2 by encrypting the shared symmetric key SSKB1 using the shared symmetric key SSKA1 and the public key PuKA1 of the client account A. The symmetric shared key identifier SSKIDB1 is encrypted by the secure communications terminal 104-2 using the unique client key UCKB of the client account B to generate the encrypted symmetric shared key identifier ESSKIDB1. In variations, the encrypted symmetric shared key identifier ESSKIDB1 can be further encrypted with the public key PuKA1 and the shared symmetric key SSKIDA1 key.

The example message MSG1 of FIG. 18 additionally includes an encrypted message key EMK1. The message key MK1 is used by secure communications terminal 104-2 to encrypt the message data, such as the message content, to generate the encrypted data EData. The message key MK1 is encrypted by the secure communications terminal 104-2 using the shared symmetric key SSKA1 and the public key PuKA1 of the client account A.

The example message MSG1 of FIG. 18 also includes an encrypted public key EPuKA1 of client account A. In this example, the client account B acquires an enhanced public key PuKA1, generated by the client account A at a secure communications terminal 104 as described above, from the public key server 112. The enhanced public key PuKA1 is used to encrypt portions of the message MSG1 as described above. The enhanced public key PuKA1 is encrypted using the shared symmetric key SSKA1. In variations, a different enhanced public key is obtained for each message (unique to that message) or set of messages to be sent to client account A. In such variations, the public key server 112 may delete or otherwise mark the provided public key PuKA1 as unavailable, so as to prevent the provision of the same public key multiple times. In further variations, a public key may not be used as part encrypting a message at all, relying on the shared symmetric key, the unique client key and the message key instead. In other alternatives, the public key used may not be enhanced, (and for example changing for each message or set of messages) but instead may be the same public key for all messages destined to a client account, until that public key expires. In such variations, the public key may not be included in the message MSG1.

Figure 19:
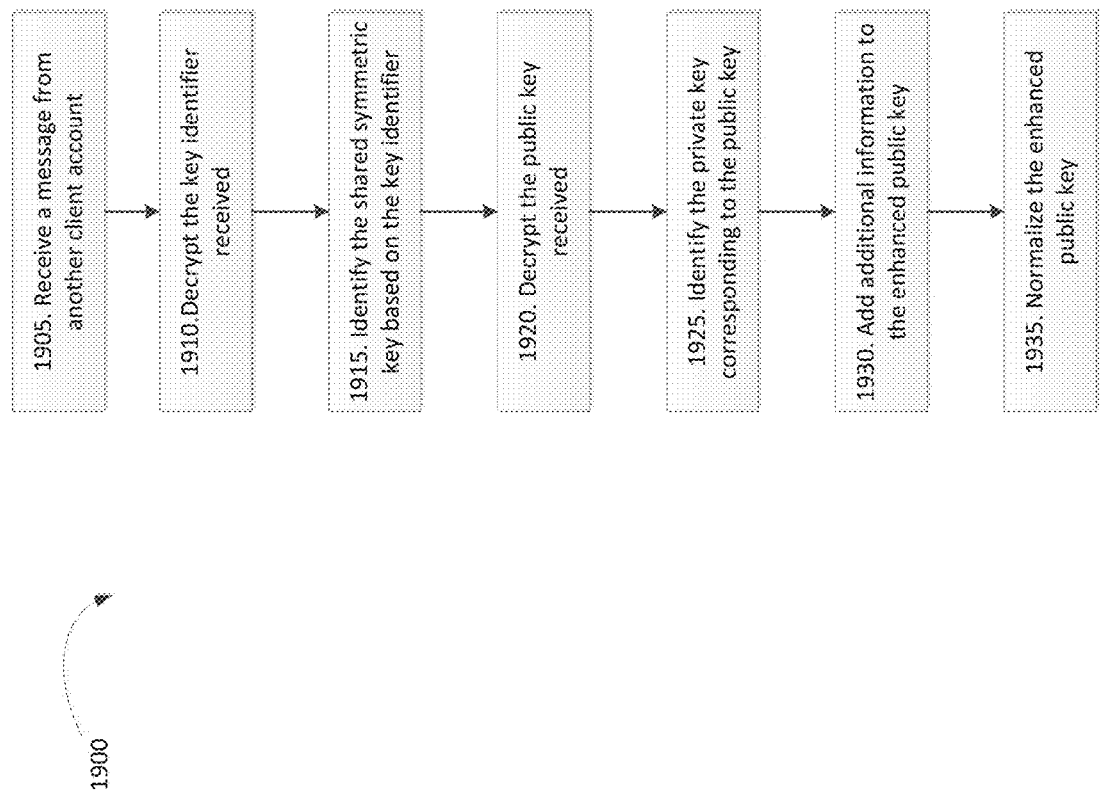
FIG. 19 shows a method of receiving secure communications by the system of FIG. 1 in accordance with an implementation.

Referring now to FIG. 19, a method of receiving secure communications is indicated generally at 1900. In order to assist in the explanation of the method, it will be assumed that method 1900 is operated using system 100 as shown in FIG. 1. Additionally, the following discussion of method 1900 leads to further understanding of system 100. However, it is to be understood that system 100, and method 1800 can be varied, and need not work exactly as discussed herein in conjunction with each other, and that such variations are within scope.

Figure 20:
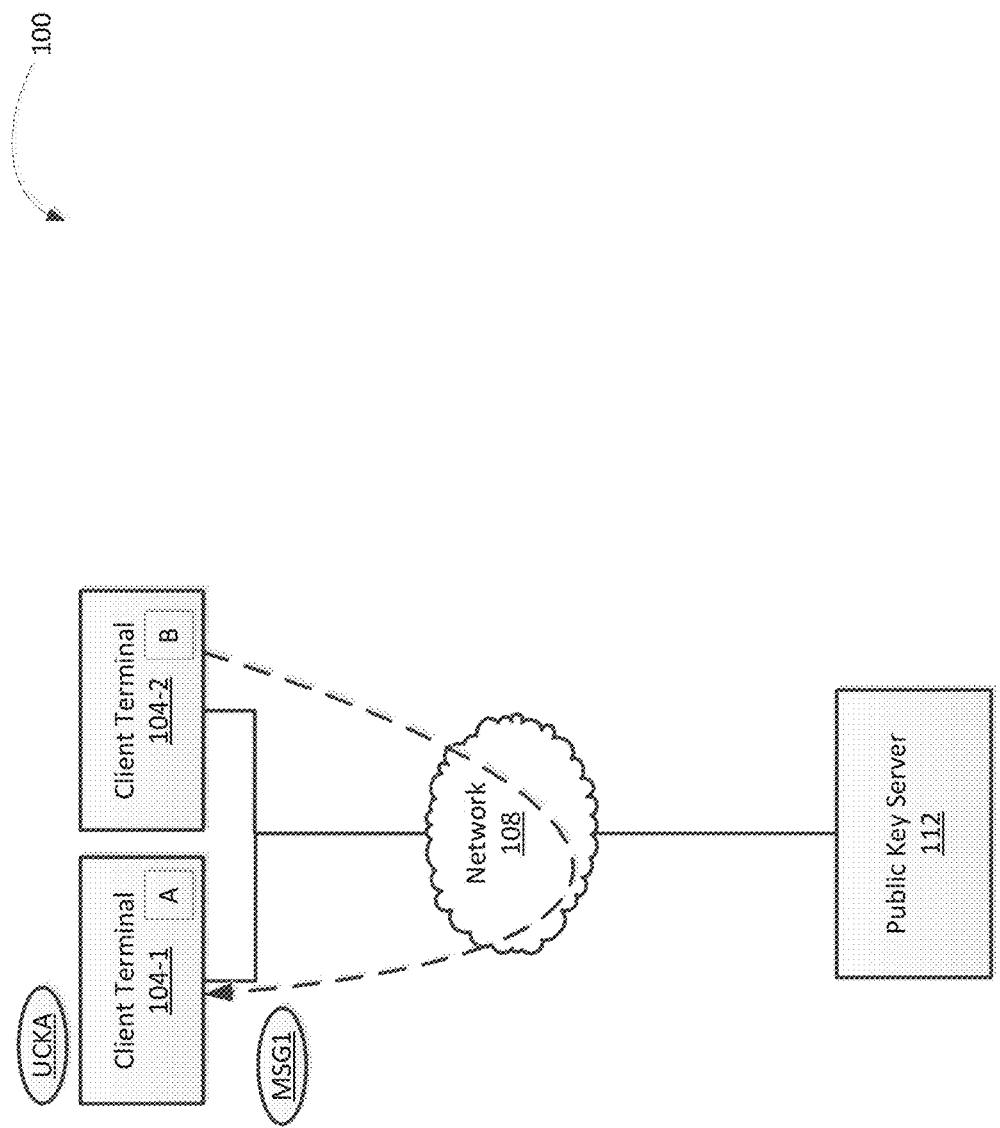
FIG. 20 shows a block diagram of the system of FIG. 1 in the process of performing the method of FIG. 19 in accordance with an implementation.
Figure 21:
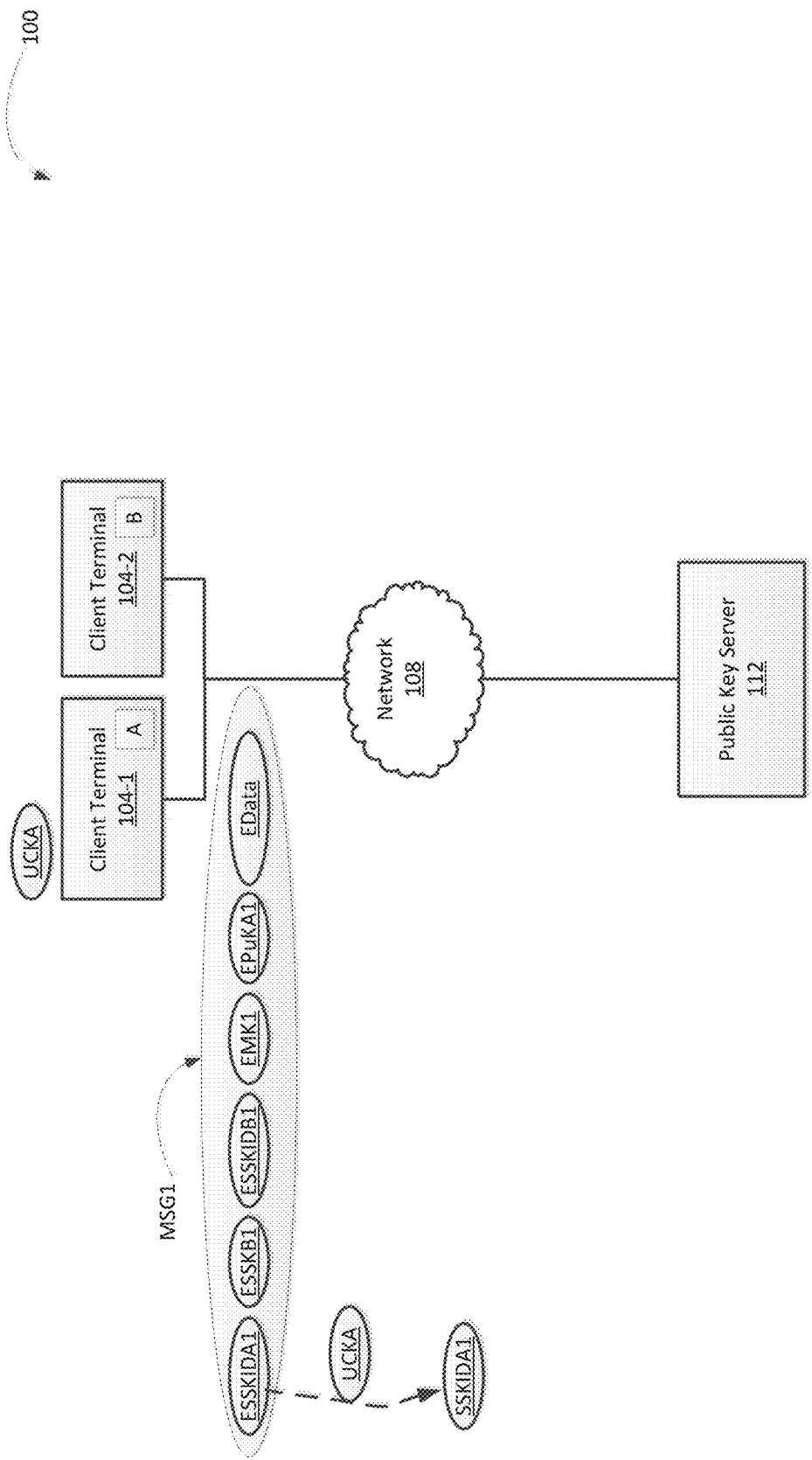
FIG. 21 shows a block diagram of the system of FIG. 1 in the process of performing the method of FIG. 19 in accordance with an implementation.

Beginning at 1905, and as shown in FIG. 20, a message MSG1 is received from the client account B at terminal 104-1 associated with the client account A. Once a message is received, it is decrypted. Accordingly, at 1910, the encrypted symmetric shared key identifier ESSKIDA1 is decrypted using the unique client key UCKA for the client account A, as shown in FIG. 21. At 1915, the symmetric shared key identifier SSKIDA1 is used to identify the shared symmetric key SSKA1 that was used to encrypt the message MSG1. It is to be understood that the SSKIDA1 can be identified in various ways. For example, all of the key pairs previously generated may be stored in a table and a particular symmetric shared key obtained based on a lookup with the corresponding identifier. Alternatively, the particular symmetric shared key can be generated based on the identifier. Other methods will now occur to a person of skill and are contemplated.

Figure 22:
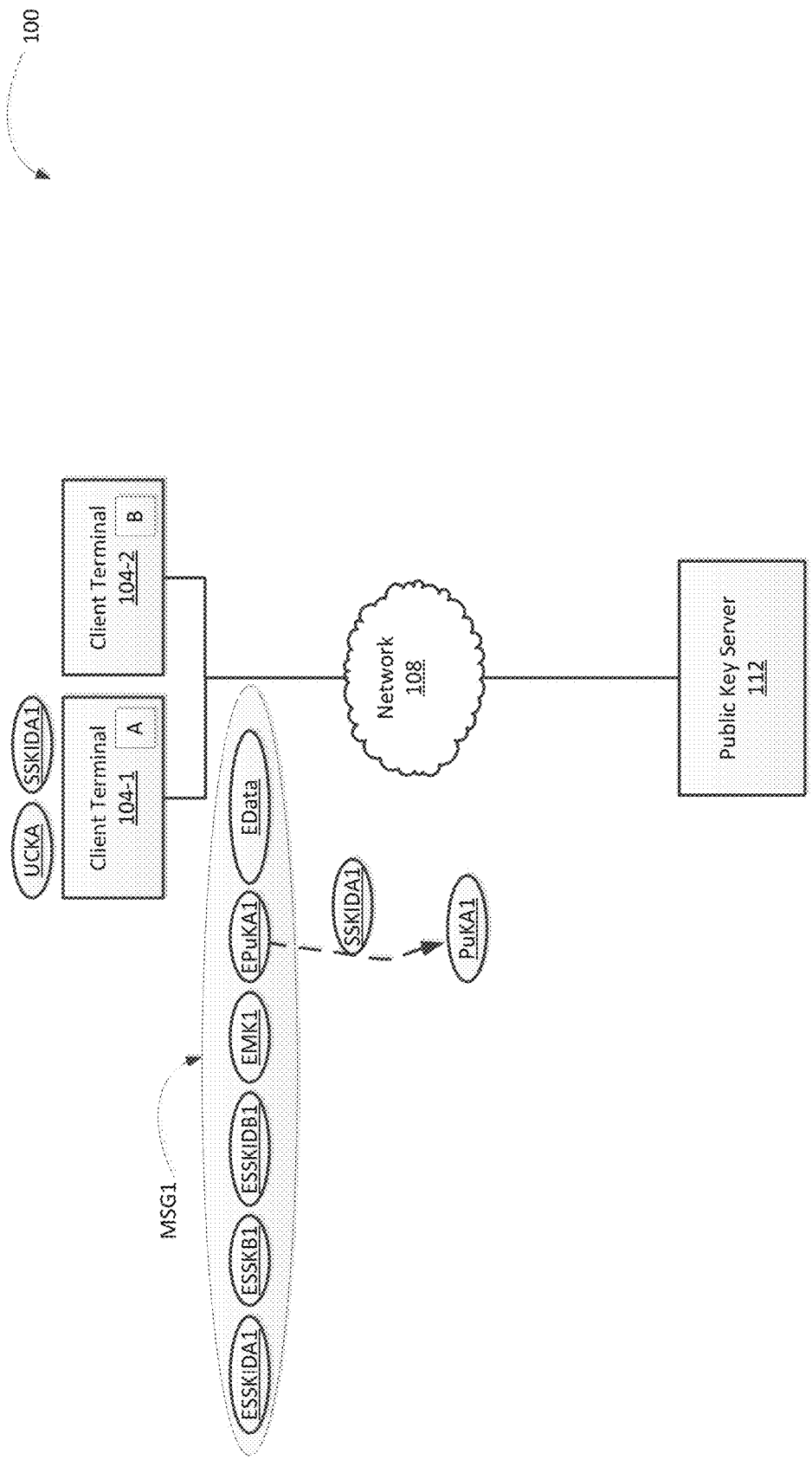
FIG. 22 shows a block diagram of the system of FIG. 1 in the process of performing the method of FIG. 19 in accordance with an implementation.

Referring back to FIG. 19 and continuing with the method 1900 at 1920 the public key included in the received message is decrypted. Specifically, as shown in FIG. 22, the encrypted public key EPuKA1 is decrypted using the shared symmetric key SSKA1 to obtain the public key PuKA1. At 1925, the private key PKRA1 is identified based on the corresponding public key PuKA1. In some variations, the private keys may be stored at the secure communications terminals 114 associated with the client account A. In variations, the public key received can be an enhanced public key as described above, and the private key PKRA1, can actually be stored within the enhanced public key received.

Figure 23:
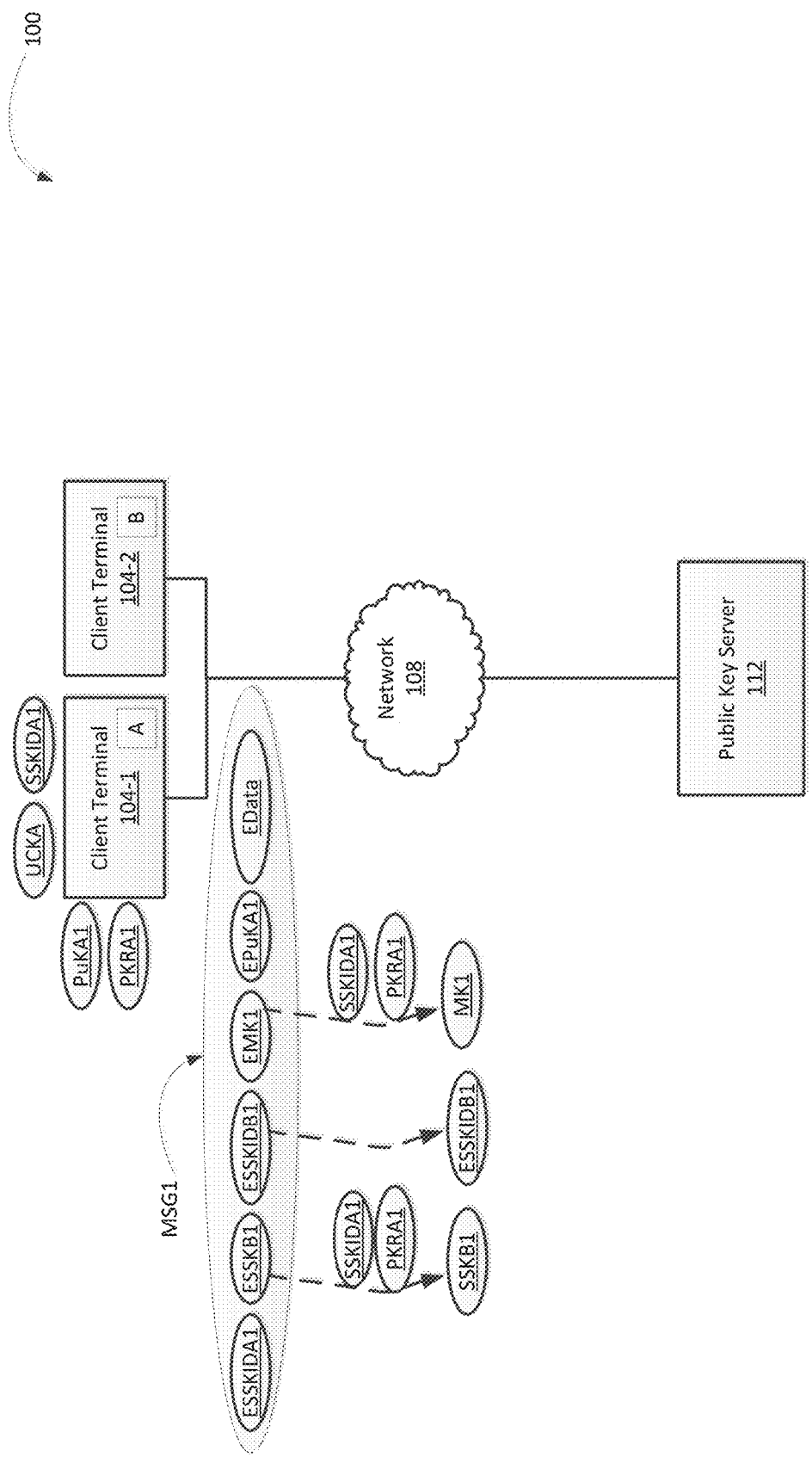
FIG. 23 shows a block diagram of the system of FIG. 1 in the process of performing the method of FIG. 19 in accordance with an implementation.

Continuing with FIG. 19, at 1930, the additional keys included in the received message are decrypted. In this example, as shown in FIG. 23, the encrypted form of the shared symmetric key SSKB1 and the message key EMK1 are decrypted using the shared symmetric key SSKA1 and the public key PuKA1 of the client account A. The encrypted symmetric shared key identifier SSKIDB1 was encrypted by client B using the unique client key UCKB of client account B and thus is extracted from the message MSG1 without decrypting it. The key pair was generated by client account B at secure communications terminal 104-2, as described above and is to be used by client account A for encrypting at least part of a message that will be sent from client account A to client account B at a future point in time.

Figure 24:
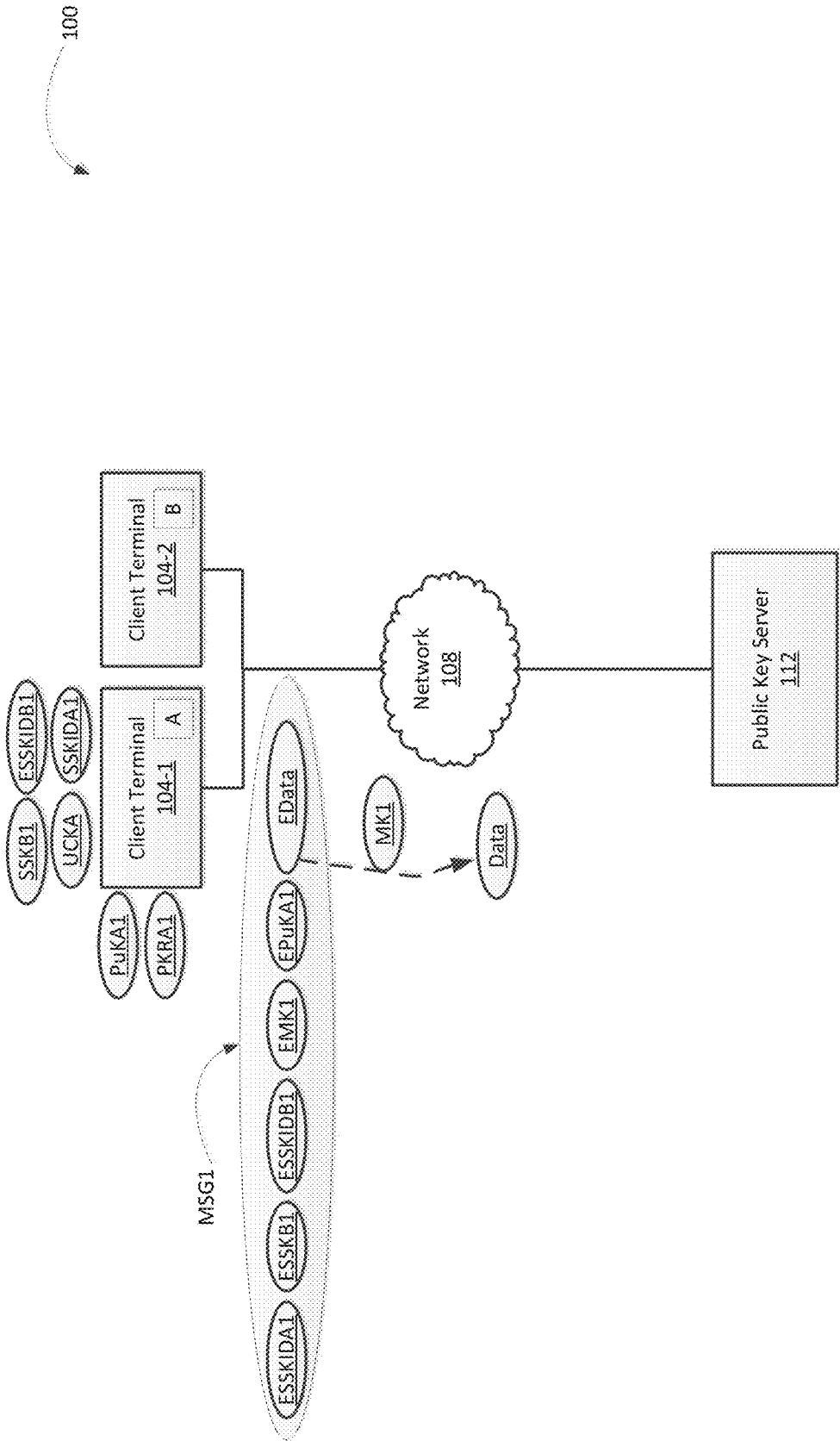
FIG. 24 shows a block diagram of the system of FIG. 1 in the process of performing the method of FIG. 19 in accordance with an implementation.

Referring back to FIG. 19, at 1935, the encrypted data portion of the received message is decrypted. In this example, as shown in FIG. 24, the encrypted data EData is decrypted using the previously decrypted message key MK1 which is unique to the message MSG1, since it was only used to encrypt the data for the message MSG1.

Figure 25:
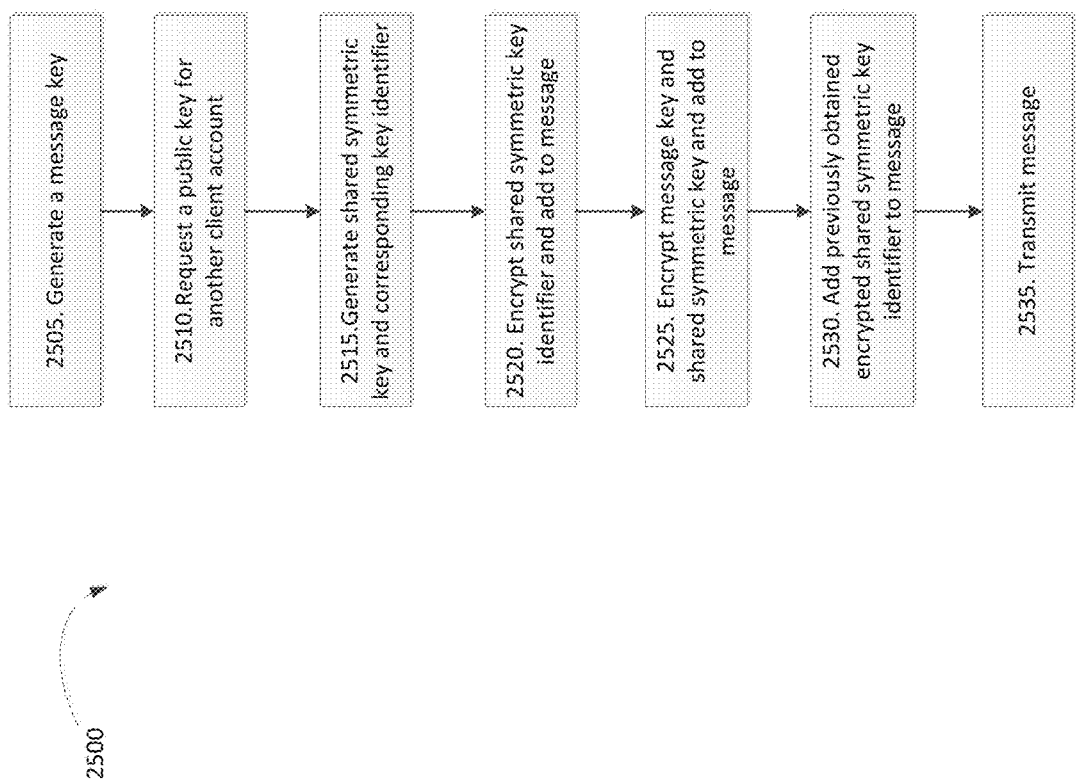
FIG. 25 shows a method of sending secure communications by the system of FIG. 1 in accordance with an implementation.

Referring now to FIG. 25, a method of sending secure communications is indicated generally at 2500. In order to assist in the explanation of the method, it will be assumed that method 2500 is operated using system 100 as shown in FIG. 1. Additionally, the following discussion of method 2500 leads to further understanding of system 100. However, it is to be understood that system 100, and method 2500 can be varied, and need not work exactly as discussed herein in conjunction with each other, and that such variations are within scope.

Figure 26:
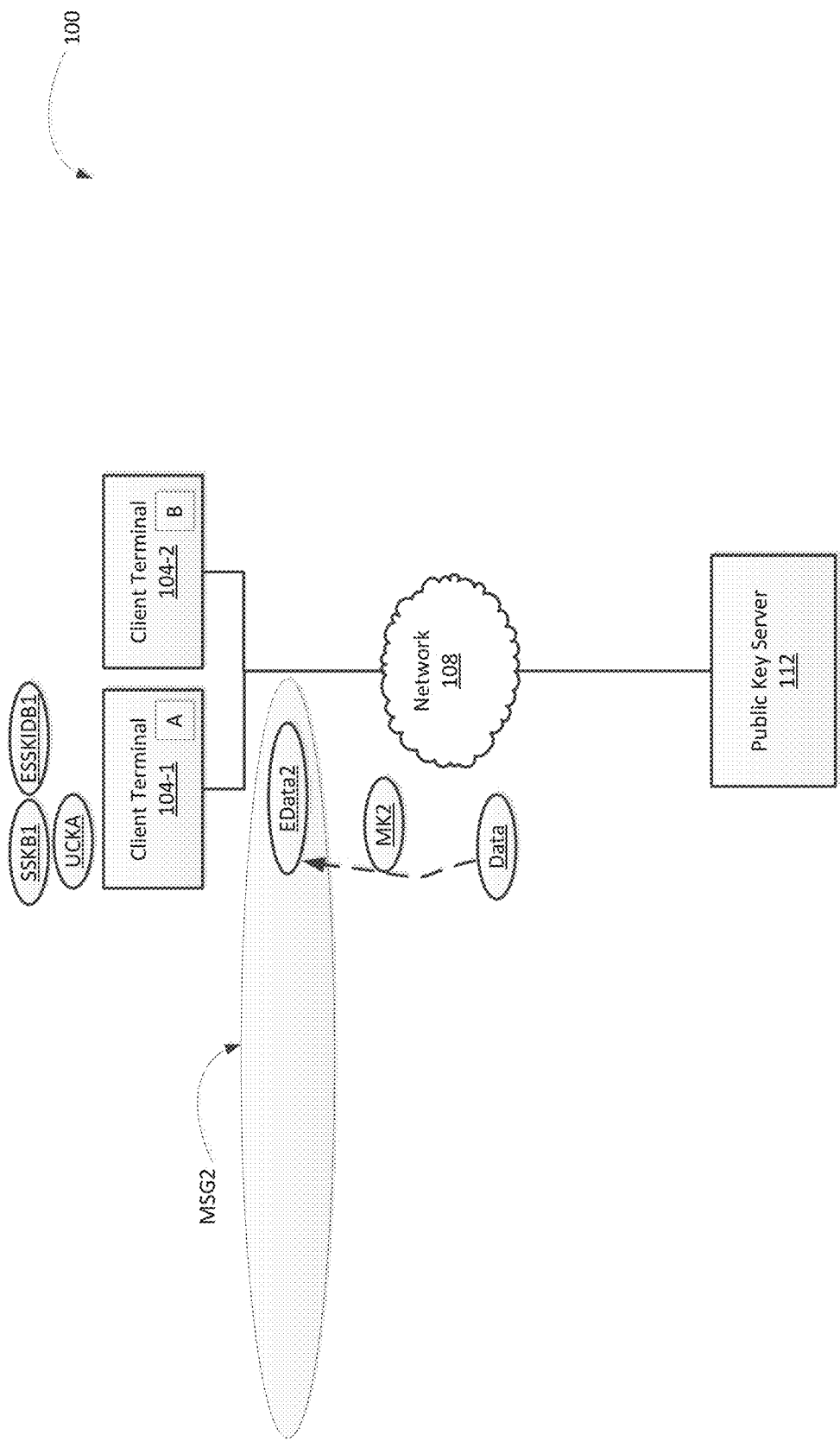
FIG. 26 shows a block diagram of the system of FIG. 1 in the process of performing the method of FIG. 25 in accordance with an implementation.

At the beginning of the method 2500, the secure communications terminal 104-1 maintains several encrypted and unencrypted keys as a result of performing the method 1800 to receive a secure communication in the form of message MSG1, relevant ones of which are shown in FIG. 26. To prepare a new secure message MSG2 to send to the client account B, a new message key MK2, unique to the message MSG2 is generated at 2505. In variations, the key can be used for multiple messages. The message key can be generated using known methods based on a random number generator for example. The data to be sent as part of the communications is obtained and encrypted using the message key MK2, and placed into the message MSG2 as Edata2 as shown in FIG. 26.

Figure 27:
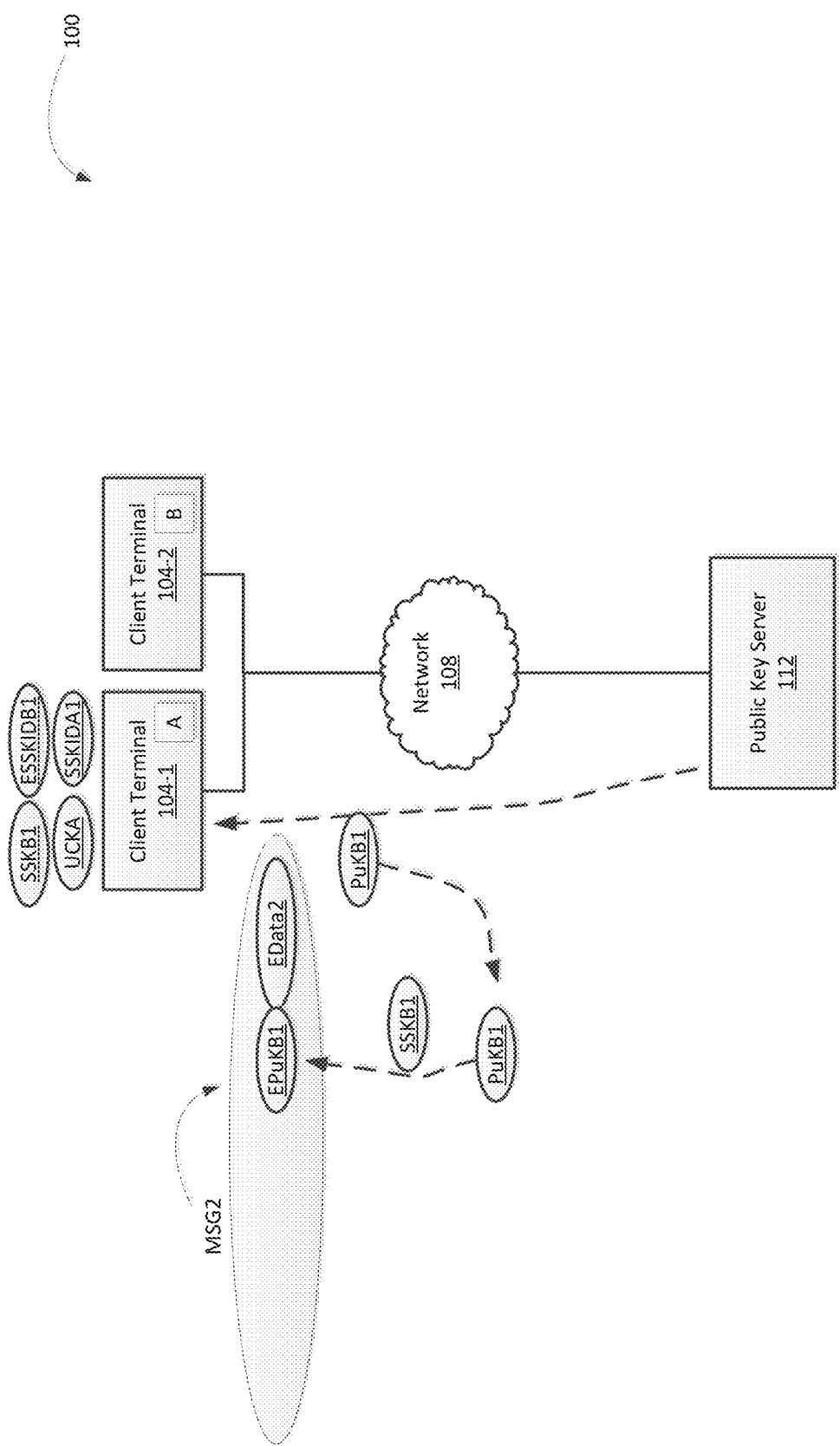
FIG. 27 shows a block diagram of the system of FIG. 1 in the process of performing the method of FIG. 25 in accordance with an implementation.

Continuing with the method 2500, at 2510 secure communications terminal 104-1 requests and receives a new public key PuKB1 associated with the client account B and encrypts it using the previously received shared symmetric key SSKB1 for client account B, as shown in FIG. 27, adding the encrypted public key EPuKB1 to the message MSG2.

Figure 28:
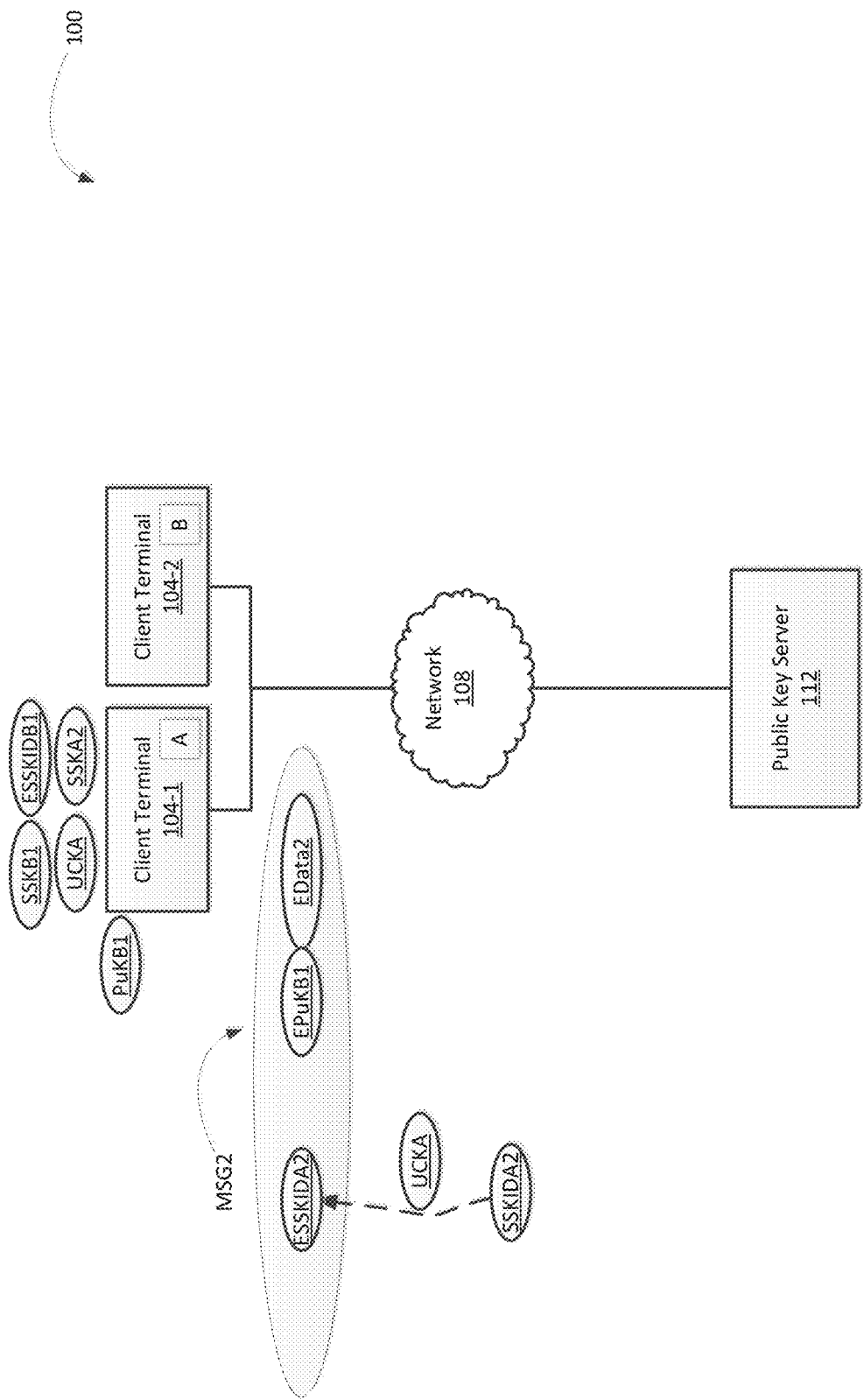
FIG. 28 shows a block diagram of the system of FIG. 1 in the process of performing the method of FIG. 25 in accordance with an implementation.

At 2515, the secure communications terminal 104-2 generates the next key pair to be used by the client account B for encrypting at least a portion of a subsequent message to be sent to the client account A. The key pair comprises the symmetric shared key identifier SSKIDA2, along with the corresponding shared symmetric key SSKA2. At 2520, the symmetric shared key identifier SSKIDA2 is encrypted using the unique client key UCKA to generate ESSKIDA2, which is in turn included in the message MSG2 as shown in FIG. 28.

Figure 29:
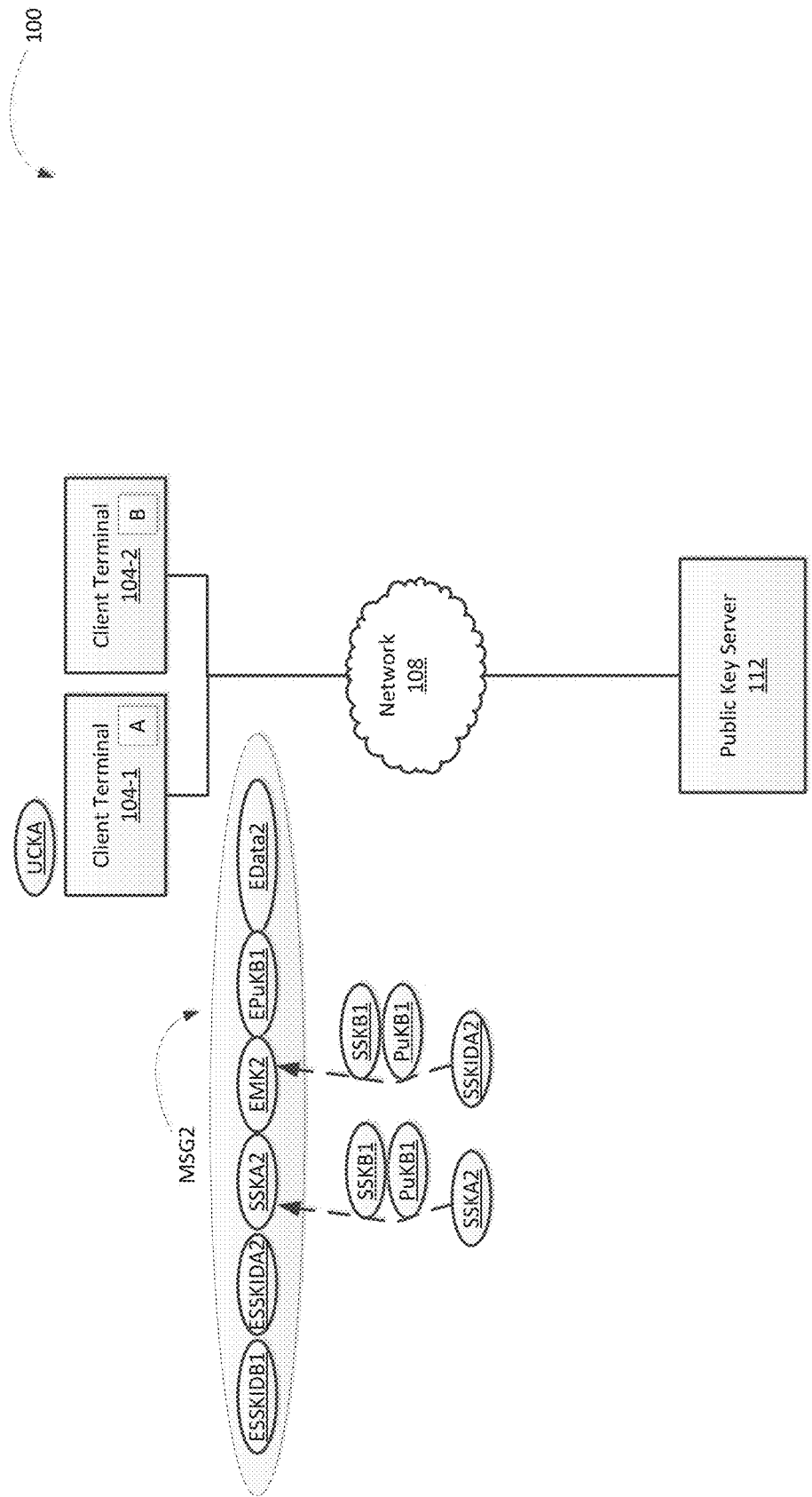
FIG. 29 shows a block diagram of the system of FIG. 1 in the process of performing the method of FIG. 25 in accordance with an implementation.

Referring back to FIG. 25, at 2525 the shared symmetric key SSKA2 and the message key MK2 are encrypted using the shared symmetric key SSKB1 and the public key PuKB1 and added to the message MSG2 as shown in FIG. 29. At 2530, the previously encrypted ESSKIDB1 is also added to the message MSG2 to indicate the shared symmetric key used for encrypting portions of the message MSG2. At 2535 the message MSG2 is transmitted to secure communications terminal 104-2.

In some variations, prior to performing any of the above described methods, a client account is created. Accordingly, when the client account is created, user credentials to be associated with the client account are obtained by a secure communications terminal 104, on the basis of which the unique client key for the newly created account is generated. For example, the unique client key can be generated on the basis of the password. Moreover, when the newly created attempts to upload the first enhanced public key to the public key server 112, the public key server 112 can request confirmation from the account by sending a confirmation request to the account credentials which can be included in the enhanced public key. The confirmation is satisfied when a reply is received for the request.

The above-described embodiments are intended to be examples and alterations and modifications may be effected thereto, by those of skill in the art, without departing from the scope which is defined solely by the claims appended hereto. For example, methods and systems discussed can be varied and combined, in full or in part.

I claim:

1. A method of receiving an enhanced public key by a public key server for security system communications, the public key server having a processor operably connected to memory and a communications interface, the method comprising:

maintaining in the memory a current enhanced public key containing an encrypted account confirmation code, the current enhanced public key being associated with a client account;

transmitting, through the communications interface, the current enhanced public key to the client account;

receiving, through the communications interface, an account confirmation code as a received account confirmation code for verifying the client account along with a new enhanced public key associated with the client account;

extracting, by the processor, the encrypted account confirmation code from the current enhanced public key and decrypting the encrypted account confirmation code using the received account confirmation code to obtain a decrypted account confirmation code;

buffering, in the memory, the new enhanced public key when the received account confirmation code matches the decrypted account confirmation code;

transmitting the buffered new enhanced public key to another client account to perform encrypted communications with the client account;

extracting, by the processor, an encrypted server authentication code from the current enhanced public key and decrypting the encrypted server authentication code using received account confirmation code; and transmitting, through the communications interface, the decrypted server authentication code for authenticating the public key server.

2. The method of claim 1 further comprising:

receiving through the communications interface, a request from a second client account for one enhanced public key associated with the client account; and providing, through the communications interface, the new enhanced public key in response to the request; and making the new enhanced public key unavailable for public provision.

3. A public key server for securing system communications, the public key server comprising:

memory;

a communications interface;

a processor operably connected to the memory and the communications interface, the processor configured to:

maintain in memory a current enhanced public key containing an encrypted account confirmation code, the current enhanced public key being associated with a client account;

transmit, through the communications interface, the current enhanced public key to the client account;

receive, through the communications interface, an account confirmation code as a received account confirmation code for verifying the client account along with a new enhanced public key associated with the client account;

extract the encrypted account confirmation code from the current enhanced public key, and decrypt the encrypted account confirmation code using the received account confirmation code to obtain a decrypted account confirmation code;

buffer, in the memory, the new enhanced public key when the received account confirmation code matches the decrypted account confirmation code;

transmit the buffered new enhanced public key to another client account to perform the encrypted communications with the client account;

extract from the current enhanced public key an encrypted server authentication code of the current enhanced public key for authenticating the public key server, and decrypt the encrypted server authentication code of the current enhanced public key using the received account confirmation code; and transmit, through the communications interface, the decrypted server authentication code for authenticating the public key server.

4. The server of claim 3, wherein the processor is further configured to:

receive, through the communications interface, a request from a second client account for one enhanced public key associated with the client account; and provide, through the communications interface, the new enhanced public key in response to the request; and make the new enhanced public key unavailable for public provision.

* * * * *